US008427922B2

(12) United States Patent
Mamiya et al.

(10) Patent No.: US 8,427,922 B2
(45) Date of Patent: Apr. 23, 2013

(54) OPTICAL PICKUP DEVICE AND OPTICAL DISC DEVICE

(75) Inventors: Noboru Mamiya, Mizuho (JP); Katsutoshi Hibino, Kaizu (JP); Kenji Nagatomi, Kaizu (JP)

(73) Assignee: Sanyo Electric Co., Ltd., Moriguchi-Shi, Osaka (JP)

( * ) Notice: Subject to any disclaimer, the term of this patent is extended or adjusted under 35 U.S.C. 154(b) by 765 days.

(21) Appl. No.: 12/690,501

(22) Filed: Jan. 20, 2010

(65) Prior Publication Data

US 2010/0182891 A1 Jul. 22, 2010

(30) Foreign Application Priority Data

Jan. 20, 2009 (JP) .................................. 2009-10369

(51) Int. Cl.
*G11B 7/00* (2006.01)

(52) U.S. Cl.
USPC .................................. 369/112.03; 369/44.41

(58) Field of Classification Search ............... 369/112.1, 369/112.01, 112.02, 112.03, 44.23, 44.24, 369/44.41, 44.42, 44.28, 44.35, 112.26, 112.12, 369/112.19
See application file for complete search history.

(56) References Cited

U.S. PATENT DOCUMENTS 8,045,432 B2 * 10/2011 Nishiwaki et al. ......... 369/53.12

FOREIGN PATENT DOCUMENTS

| | | | |
|---|---|---|---|
| JP | 11-353666 | A | 12/1999 |
| JP | 2006-252716 | A | 9/2006 |
| JP | 2006-260669 | A | 9/2006 |
| JP | 2008-171470 | A | 7/2008 |

OTHER PUBLICATIONS

Explanation of Circumstances filed in the corresponding Japanese Application No. 2009-010369, filed Dec. 21, 2010, pp. 1-11, Japan.

* cited by examiner

*Primary Examiner* — Nabil Hindi
(74) *Attorney, Agent, or Firm* — Ditthavong Mori & Steiner, P.C.

(57) ABSTRACT

An optical pickup device is so configured as to change the propagating directions of light fluxes in four light flux areas defined in the periphery of an optical axis of laser light, out of the laser light reflected on a disc, to separate the four light fluxes one from the other. A signal light area where only signal light exists is defined on a detecting surface of a photodetector. Sensors for signal light is disposed at a position in the signal light area to be irradiated by the signal light, and a tracking error signal is generated based on a signal from the sensors. A direct-current component of the tracking error signal resulting from positional displacements of the sensors is cancelled by adjusting a gain of the signal from the sensor.

6 Claims, 20 Drawing Sheets

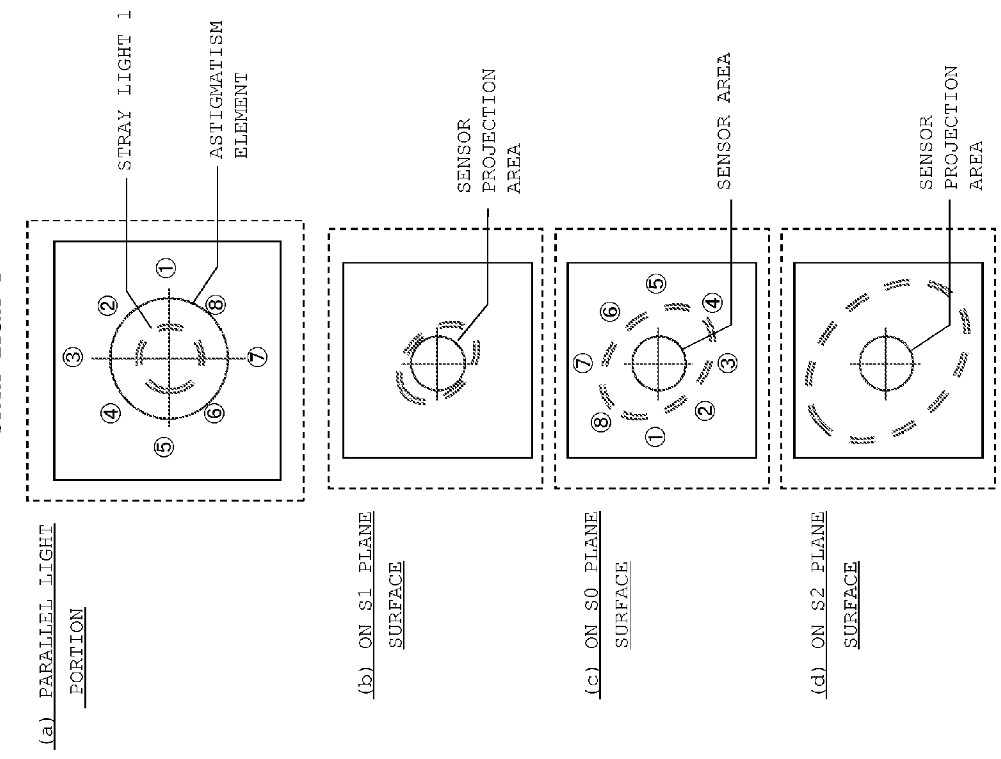
FIG. 2B
< STRAY LIGHT 1 >
(a) PARALLEL LIGHT PORTION
STRAY LIGHT 1
ASTIGMATISM ELEMENT
(b) ON S1 PLANE SURFACE
SENSOR PROJECTION AREA
(c) ON S0 PLANE SURFACE
SENSOR AREA
(d) ON S2 PLANE SURFACE
SENSOR PROJECTION AREA

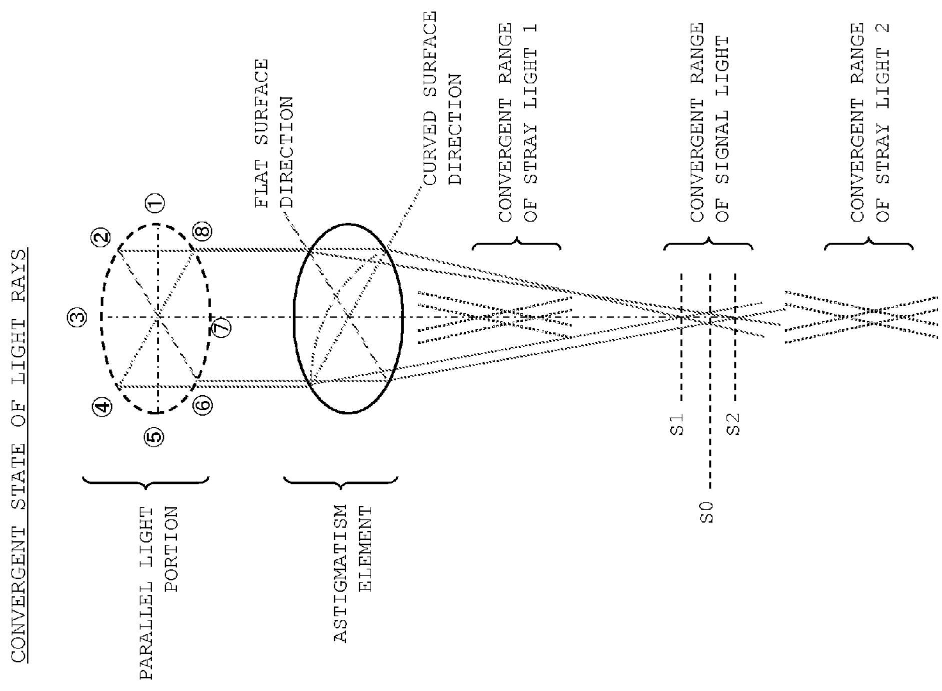
FIG. 2A
CONVERGENT STATE OF LIGHT RAYS
PARALLEL LIGHT PORTION
ASTIGMATISM ELEMENT
FLAT SURFACE DIRECTION
CURVED SURFACE DIRECTION
CONVERGENT RANGE OF STRAY LIGHT 1
CONVERGENT RANGE OF SIGNAL LIGHT
CONVERGENT RANGE OF STRAY LIGHT 2
S1
S0
S2

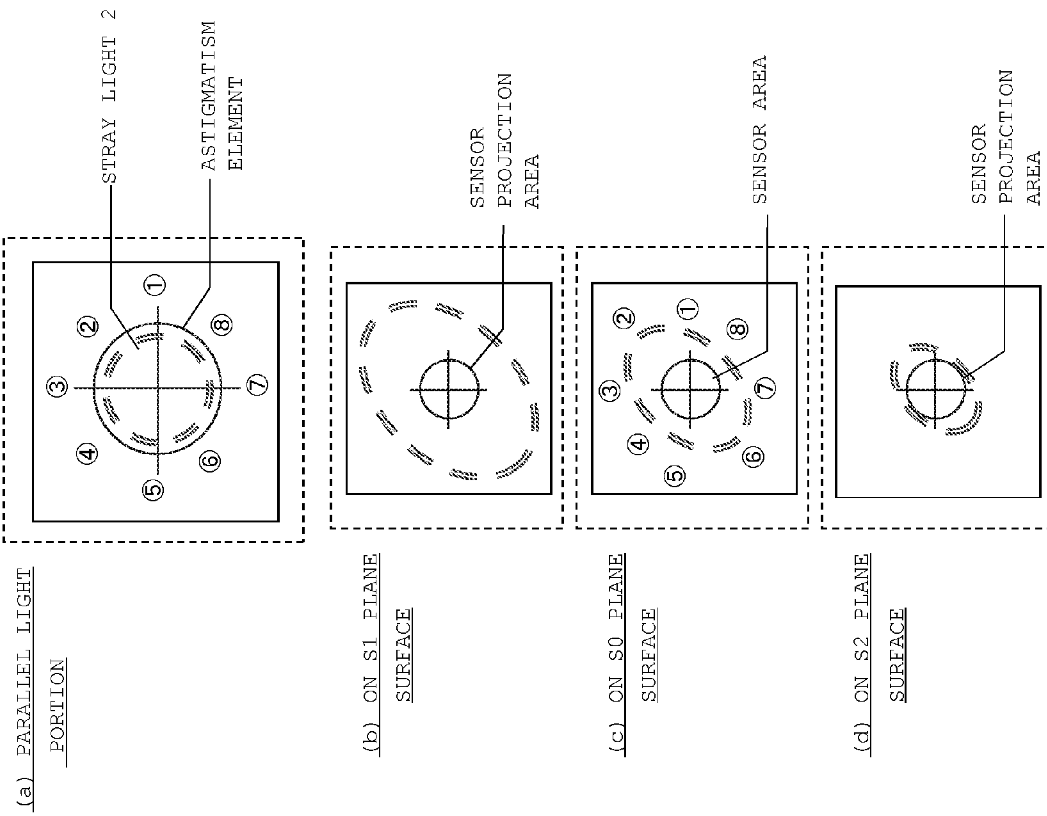
FIG. 3B
< STRAY LIGHT 2 >
(a) PARALLEL LIGHT PORTION
STRAY LIGHT 2
ASTIGMATISM ELEMENT
①
②
③
④
⑤
⑥
⑦
⑧
(b) ON S1 PLANE SURFACE
SENSOR PROJECTION AREA
(c) ON S0 PLANE SURFACE
SENSOR AREA
(d) ON S2 PLANE SURFACE
SENSOR PROJECTION AREA

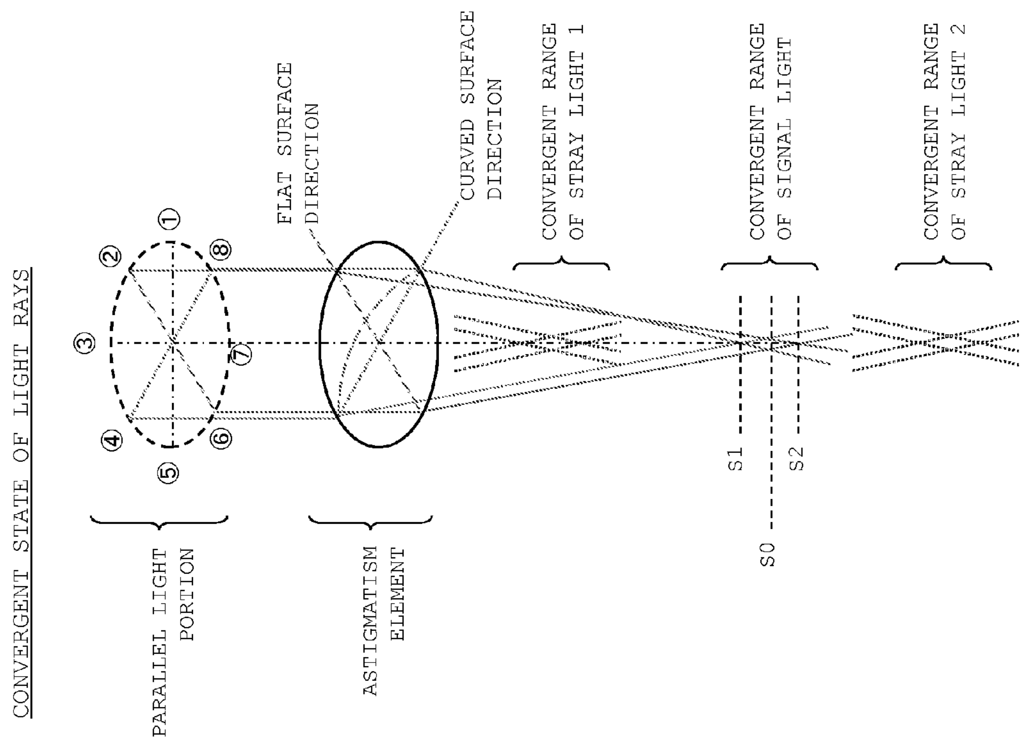
FIG. 3A
CONVERGENT STATE OF LIGHT RAYS
PARALLEL LIGHT PORTION
ASTIGMATISM ELEMENT
FLAT SURFACE DIRECTION
CURVED SURFACE DIRECTION
CONVERGENT RANGE OF STRAY LIGHT 1
CONVERGENT RANGE OF SIGNAL LIGHT
CONVERGENT RANGE OF STRAY LIGHT 2
S1
S0
S2

< SIGNAL LIGHT >
< STRAY LIGHT 1 >
< STRAY LIGHT 2 >
(a) PARALLEL LIGHT PORTION
(b) ON S1 PLANE SURFACE
(c) ON S0 PLANE SURFACE
(d) ON S2 PLANE SURFACE
①
②
③
④
⑤
⑥
⑦
⑧

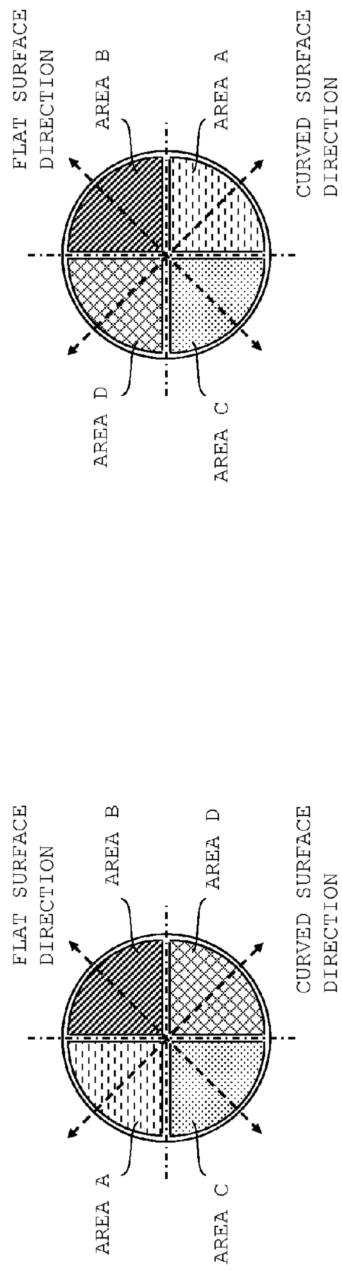
FIG. 5A LIGHT FLUX DIVIDING PATTERN
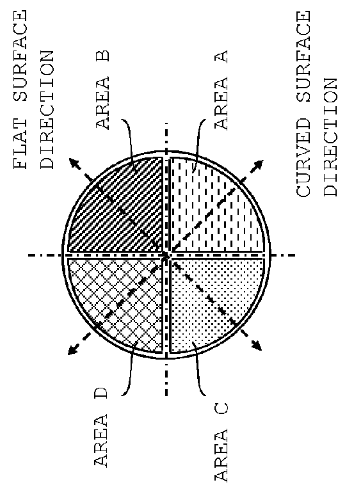
FIG. 5B SIGNAL LIGHT
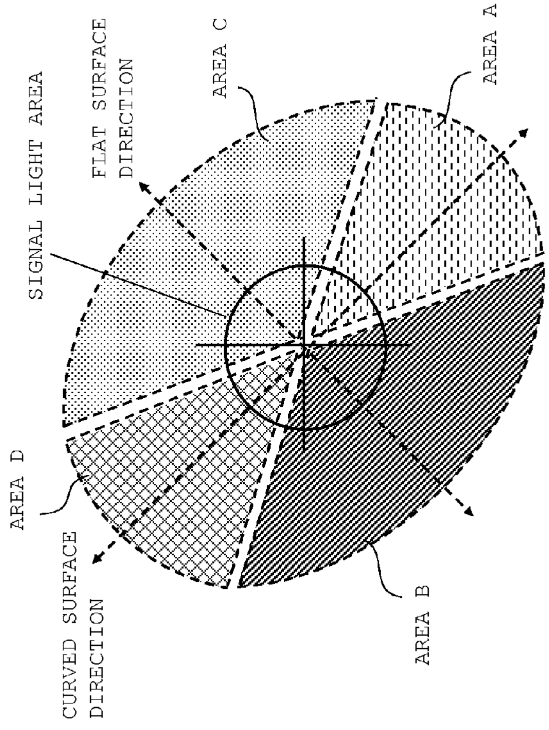
FIG. 5C STRAY LIGHT 1
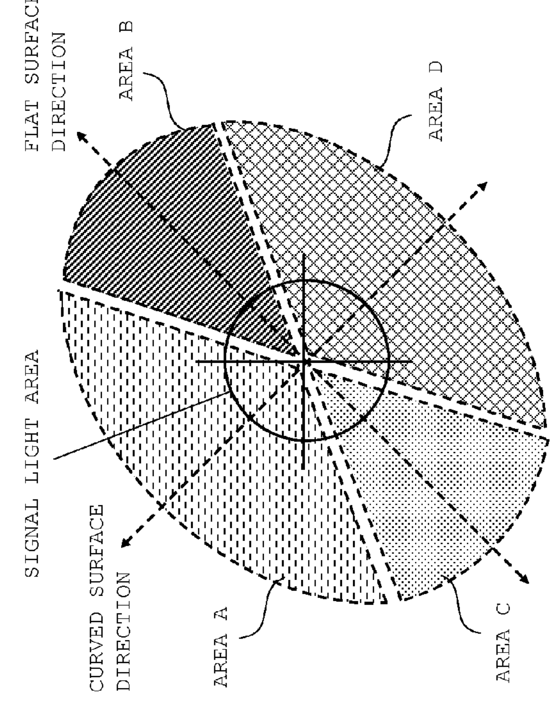
FIG. 5D STRAY LIGHT 2

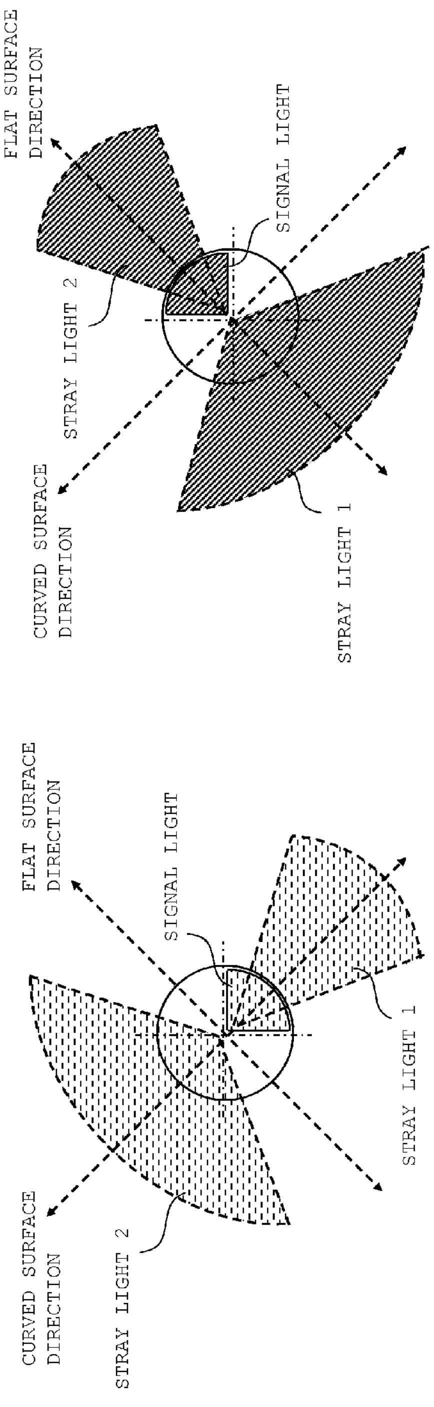
*FIG. 6A* LIGHT FLUX STATE IN AREA A
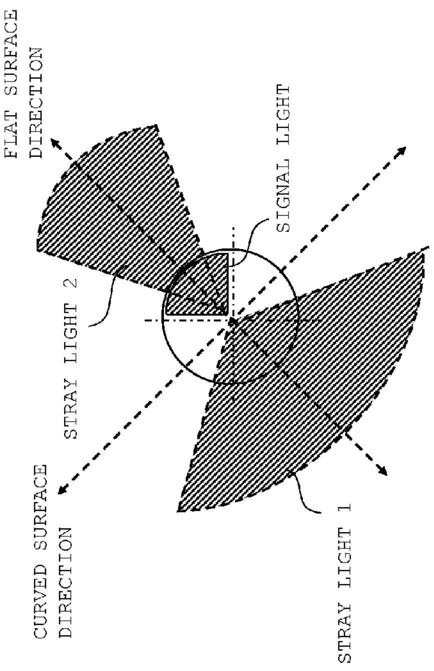
*FIG. 6B* LIGHT FLUX STATE IN AREA B
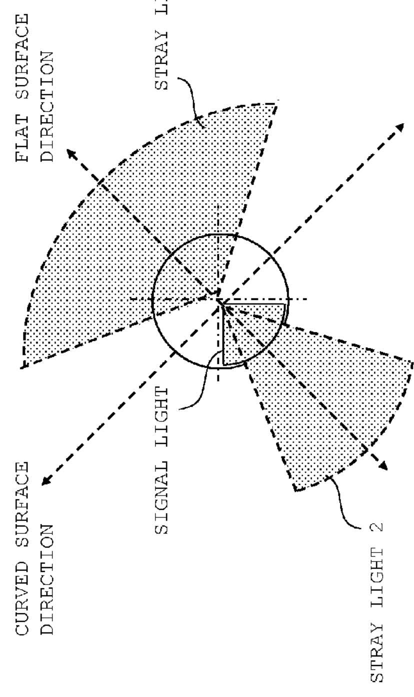
*FIG. 6C* LIGHT FLUX STATE IN AREA C
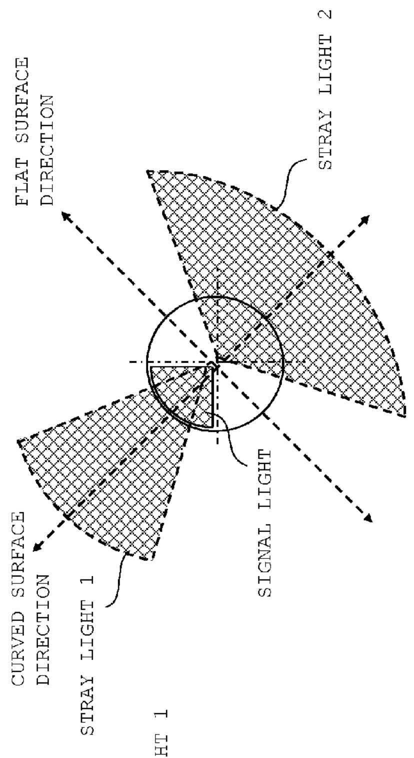
*FIG. 6D* LIGHT FLUX STATE IN AREA D

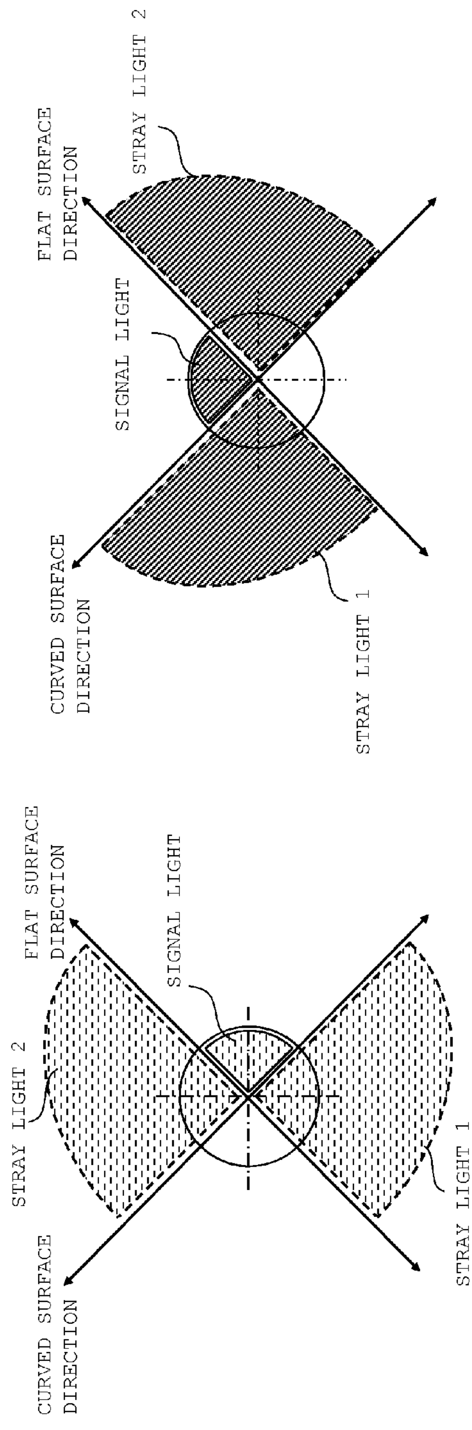
FIG. 8A LIGHT FLUX STATE IN AREA A
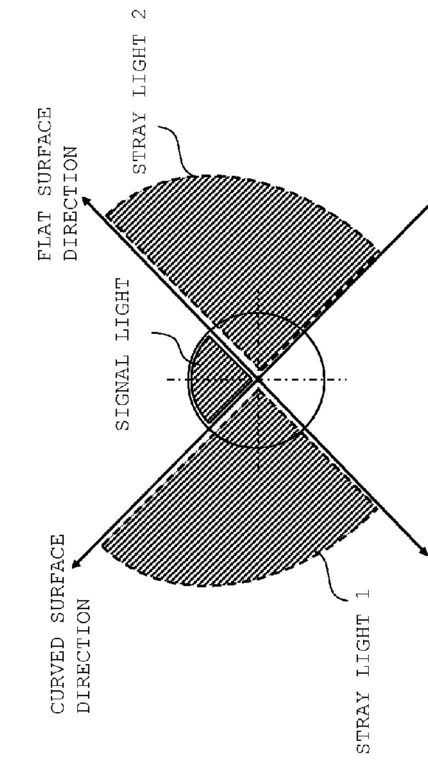
FIG. 8B LIGHT FLUX STATE IN AREA B
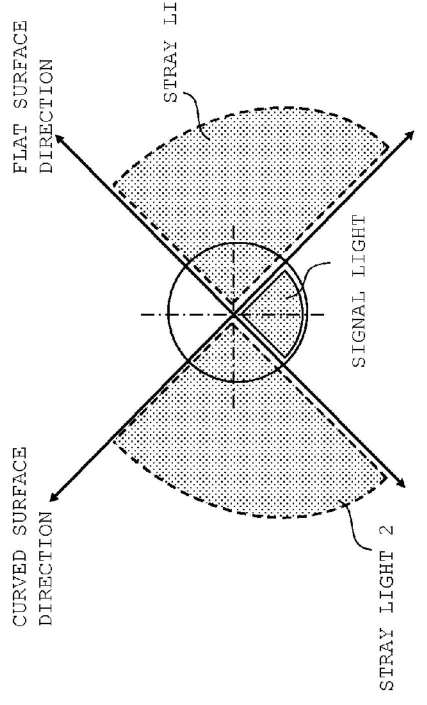
FIG. 8C LIGHT FLUX STATE IN AREA C
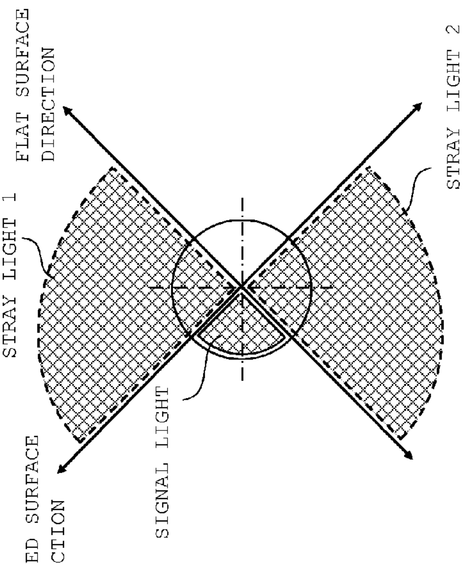
FIG. 8D LIGHT FLUX STATE IN AREA D

PROVIDE ANGLAR CHANGE TO EACH AREA

LIGHT FLUX ON PLANE S0

$PP = (A+B+G+H) - (C+D+E+F)$

FE = (A+B+E+F) − (C+D+G+H)

TE
30
23
PP1
29
×k
28
PP2
22
PP1R
27
β
26
α
25
PP2R
P18
P16
P17
P15
P14
P11
P13
P12
a
h
f
c
g
b
d
e
COMPARISON OPERATION SECTION
31
PP1L
21
PP2L
24

TE
30
29
23
PP1
PP2
28
22
PP1R
25
26
α
PP2R
P18
P16
P17
P15
P14
P11
P13
P12
COMPARISON
OPERATION
SECTION
PP2L
PP1L
21
24
31
×k
a
h
f
g
c
b
d
e

TE
30
PP1
23
PP2
28
27
β·k
26
α·k
22
PP1R
25
PP2R
P18
P17
P16
P15
P14
P13
P11
P12
a
b
c
d
e
f
g
h
COMPARISON
OPERATION
SECTION
31
PP2L
PP1L
21
24

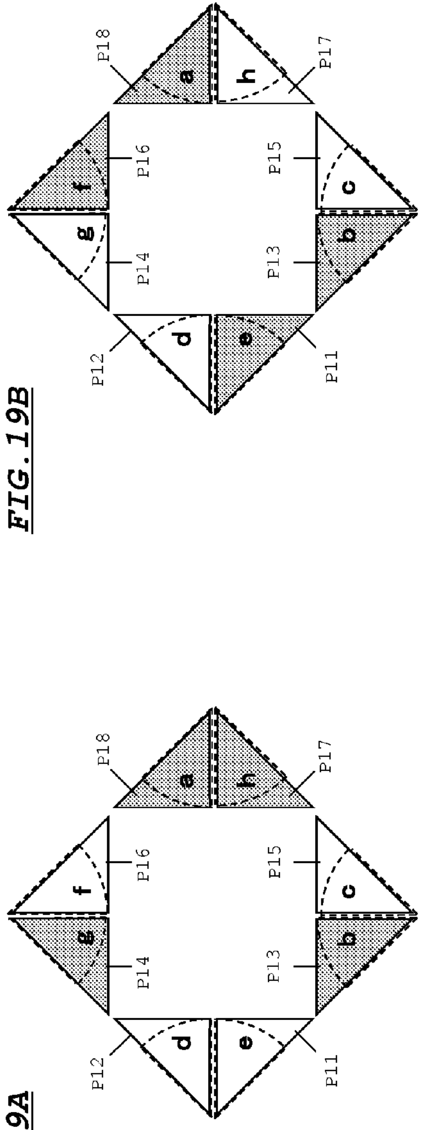
FIG. 19A
P11
P12
P13
P14
P15
P16
P17
P18
a
b
c
d
e
f
g
h
FIG. 19B
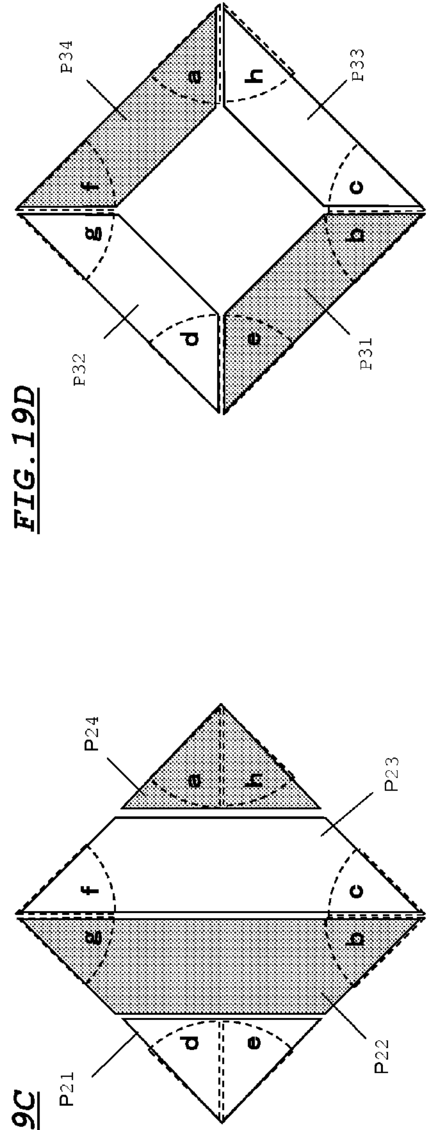
FIG. 19C
P21
P22
P23
P24
FIG. 19D
P31
P32
P33
P34

OPTICAL PICKUP DEVICE AND OPTICAL DISC DEVICE

This application claims priority under 35 U.S.C. Section 119 of Japanese Patent Application No. 2009-10369 filed Jan. 20, 2009, entitled "OPTICAL PICKUP DEVICE AND OPTICAL DICS DEVICE". The disclosure of the above application is incorporated herein by reference.

BACKGROUND OF THE INVENTION

1. Field of the Invention

The present invention relates to an optical pickup device and an optical disc device, and more particularly, relates to an optical pickup device and optical disc device suitable in use for recording to and reproducing from a recording medium having laminated recording layers.

2. Disclosure of Related Art

In recent years, as the capacity of an optical disc has been increased, an optical disc having an increased number of recording layers has been developed. Laminating recording layers in a disc enables to considerably increase the data capacity of the disc. In the case where recording layers are laminated, generally, two recording layers are laminated on one side of a disc. Recently, however, laminating three or more recording layers on one side of a disc has been put into practice to further increase the capacity of the disc. Thus, the capacity of a disc can be increased by increasing the number of recording layers to be laminated. However, as the number of recording layers to be laminated is increased, the distance between the recording layers is decreased, and signal deterioration resulting from an interlayer crosstalk is increased.

As the number of recording layers to be laminated is increased, reflection light from a recording layer (a targeted recording layer) to be recorded/reproduced is reduced. As a result, if unwanted reflection light (stray light) is entered into a photodetector from a recording layer on or under the targeted recording layer, a detection signal may be deteriorated, which may adversely affect focus servo control and tracking servo control. In view of this, in the case where a large number of recording layers are laminated, it is necessary to properly remove stray light, and stabilize a signal from a photodetector.

As a method for removing stray light, there is proposed a method using a pinhole. In this method, a pinhole is formed at a position where signal light is converged. In this method, an unwanted stray light component entered into a photodetector can be reduced, because a part of stray light is blocked by the pinhole. There is proposed a method using a half wavelength plate and a polarizing optical element in combination, as another method for removing stray light. In this method, a polarization direction of stray light is changed by the half wavelength plate, and the stray light is blocked by the polarizing optical element. This enables to prevent an unwanted stray light component from being entered into a photodetector.

However, in the method for removing stray light using a pinhole, it is necessary to accurately position the pinhole at a position where laser light (signal light) reflected on a targeted recording layer is converged. In this method, therefore, it is difficult to adjust the position of the pinhole. If the size of the pinhole is increased to easily adjust the position of the pinhole, stray light is more likely to pass through the pinhole, which obstructs the effect of suppressing signal deterioration resulting from stray light.

In the method for removing stray light by combined use of a half wavelength plate and a polarizing optical element, each two half wavelength plates and polarizing optical elements are necessary. In addition, two lenses are necessary to remove stray light. Thus, the number of parts and the cost are increased. Further, it is cumbersome to adjust the arrangement positions of these members. Furthermore, it is necessary to secure a space for arranging these members side by side, which may increase the size of an optical system.

In an optical disc device, a tracking error signal is generated, based on a light amount distribution of laser light reflected on a disc. If the position of a photodetector with respect to an optical axis of laser light is not properly set, a DC component may be superimposed on a tracking error signal, resulting from the positional displacement. Thus, in the optical disc device, there is a demand for a method for effectively suppressing a DC component.

SUMMARY OF THE INVENTION

A first aspect of the invention is directed to an optical pickup device including: a laser light source; an objective lens which converges laser light emitted from the laser light source on a recording medium; an astigmatism element which imparts astigmatism to the laser light reflected on the recording medium to distance a position of first focal line apart from a position of a second focal line in a propagating direction of the laser light. The first focal line is defined by convergence of the laser light in a first direction. The second focal line is defined by convergence of the laser light in a second direction perpendicular to the first direction. The optical pickup device further includes an angular adjuster which changes propagating directions of light fluxes in four division areas one from the other, the four division areas being obtained by dividing a light flux area of the laser light reflected on the recording medium by a first straight line and a second straight line that are respectively in parallel to the first direction and the second direction, and perpendicularly intersecting with each other; a photodetector including eight sensors which individually receives eight light fluxes obtained by dividing the light fluxes in the four division areas by a third straight line and a fourth straight line respectively rotated with respect to the first straight line and the second straight line by 45 degrees; a computing circuit which generates a tracking error signal based on signals from the sensors; and a gain adjusting circuit which adjusts a gain of the signal from the sensor in such a manner that a direct-current component of the tracking error signal resulting from positional displacements of the sensors is cancelled, based on the positional displacements of the sensors in a parallel direction to a light receiving surface of the photodetector.

An optical disc device according to a second aspect of the invention is an optical disc device including: a laser light source; an objective lens which converges laser light emitted from the laser light source on a recording medium; an astigmatism element which imparts astigmatism to the laser light reflected on the recording medium to distance a position of first focal line apart from a position of a second focal line in a propagating direction of the laser light. The first focal line is defined by convergence of the laser light in a first direction. The second focal line is defined by convergence of the laser light in a second direction perpendicular to the first direction. The optical pickup device further includes an angular adjuster which changes propagating directions of light fluxes in four division areas one from the other, the four division areas being obtained by dividing a light flux area of the laser light reflected on the recording medium by a first straight line and a second straight line that are respectively in parallel to the first direction and the second direction, and perpendicularly intersecting with each other; a photodetector including eight sensors which individually receives eight light fluxes obtained by dividing the light fluxes in the four division areas by a third straight line and a fourth straight line respectively rotated with respect to the first straight line and the second straight line by 45 degrees; a computing circuit which generates a tracking error signal based on signals from the sensors; and a gain adjusting circuit which adjusts a gain of the signal from the sensor in such a manner that a direct-current component of the tracking error signal resulting from positional displacements of the sensors is cancelled, based on the positional displacements of the sensors in a parallel direction to a light receiving surface of the photodetector.

BRIEF DESCRIPTION OF THE DRAWINGS

These and other objects, and novel features of the present invention will become more apparent upon reading the following detailed description of the embodiment along with the accompanying drawings.

FIGS. 2A and 2B are diagrams for describing the technical principle (as to how light rays propagate) in the embodiment.

FIGS. 3A and 3B are diagrams for describing the technical principle (as to how light rays propagate) in the embodiment.

FIGS. 5A through 5D are diagrams for describing the technical principle (an area dividing pattern and a light flux distribution) in the embodiment.

FIGS. 6A through 6D are diagrams for describing the technical principle (an area dividing pattern and a light flux distribution) in the embodiment.

FIGS. 8A through 8D are diagrams for describing the technical principle (an area dividing pattern and a light flux distribution) in the embodiment.

FIGS. 19A through 19D are diagrams showing modifications of a sensor configuration in the inventive example.

Figure 1A:
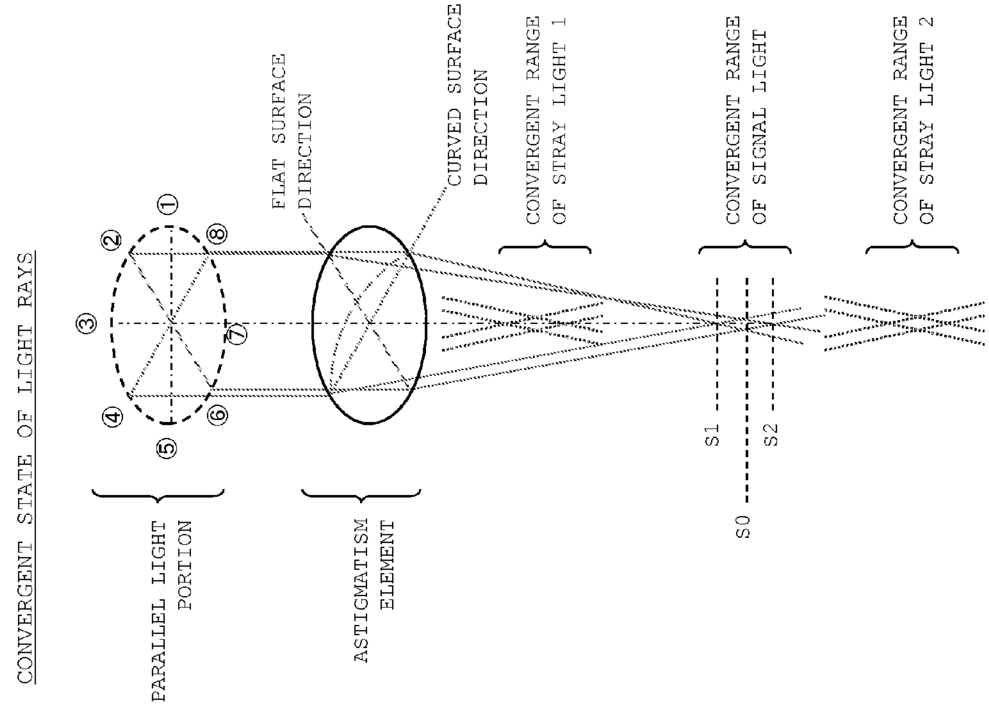
FIGS. 1A and 1B are diagrams for describing a technical principle (as to how light rays propagate) in an embodiment of the invention.

The drawings are provided mainly for describing the present invention, and do not limit the scope of the present invention.

DESCRIPTION OF PREFERRED EMBODIMENTS

In the following, an embodiment of the invention is described referring to the drawings.

Technical Principle

First, a technical principle to which the embodiment of the invention is applied is described referring to FIGS. 1A through 10D.

FIG. 1A is a diagram showing a convergent state of signal light and stray light, in the case where laser light (signal light) reflected on a targeted recording layer is entered into an astigmatism element such as an anamorphic lens as parallel light. "Stray light 1" is laser light reflected on a recording layer adjacent to the targeted recording layer at a rearward position of the target recording layer with respect to the laser light incident side, and "stray light 2" is laser light reflected on a recording layer adjacent to the targeted recording layer at a forward position of the targeted recording layer with respect to the laser light incident side. FIG. 1A shows a state that signal light is focused on the targeted recording layer.

As shown in FIG. 1A, a focal line is defined on a plane S1 by convergence of signal light in a "curved surface direction" in FIG. 1A, and a focal line is defined on a plane S2 by convergence of signal light in a "flat surface direction" perpendicular to the curved surface direction, by the function of the anamorphic lens. Then, the spot of signal light is minimized (a least circle of confusion is defined) on a plane S0 between the plane S1 and the plane S2. In focus adjustment based on an astigmatism method, a light receiving surface of a photodetector is disposed on the plane S0. In this example, to simplify the description on the astigmatism function by the anamorphic lens, the terms "curved surface direction" and "flat surface direction" are used. Actually, however, as far as the anamorphic lens has a function of defining focal lines at different positions from each other, the anamorphic lens may have a curvature in the "flat surface direction" shown in FIG. 1A.

As shown in FIG. 1A, the focal line position of stray light 1 (in FIG. 1A, a range between two focal line positions defined by the astigmatism element is referred to as a "convergent range") is closer to the astigmatism element with respect to the focal line position of signal light; and the focal line position of stray light 2 is away from the astigmatism element with respect to the focal line position of signal light.

Figure 1B:
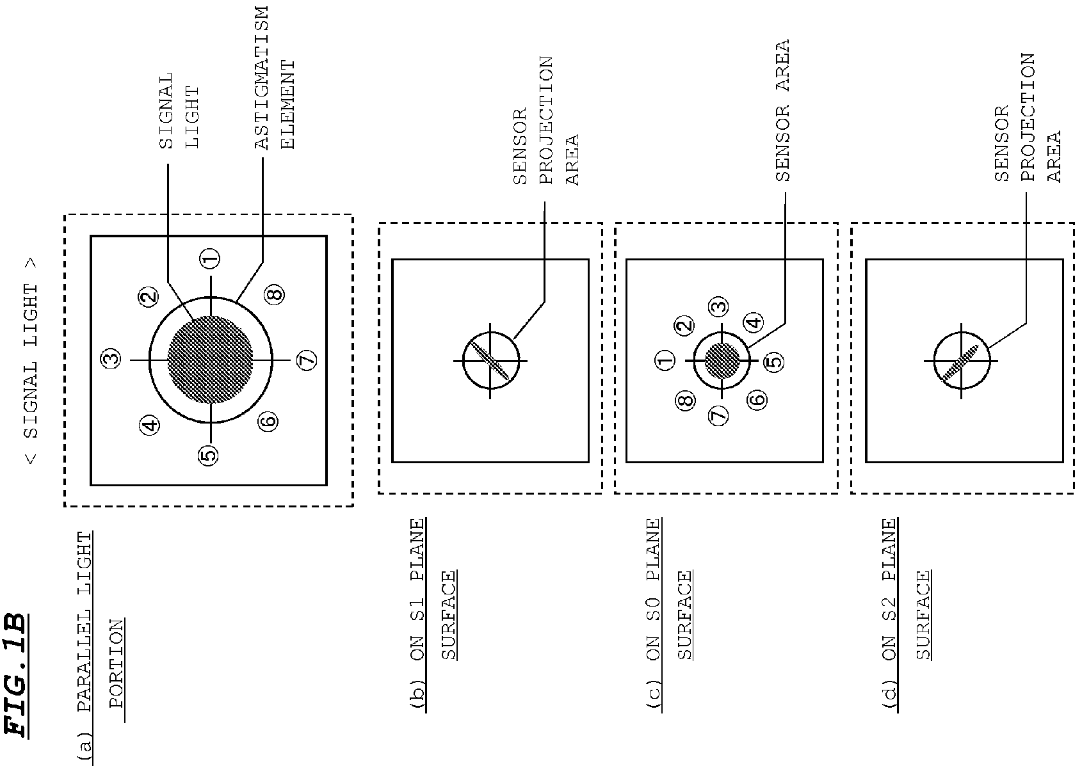

The sections (a) through (d) in FIG. 1B are diagrams respectively showing beam configurations of signal light on a parallel light portion, and the planes S1, S0, and S2. Signal light entered into the astigmatism element in the shape of a true circle is converted into light of an elliptical shape on the plane S1, and converted into light of a substantially true circle on the plane S0, and then converted into light of an elliptical shape on the plane S2. In this example, the beam configuration on the plane S1 and the beam configuration on the plane S2 have such a relation that the major axes of the beams are perpendicular to each other.

In this example, as shown in FIG. 1A and the section (a) in FIG. 1B, in the case where eight positions (positions 1 through 8: in FIGS. 1A and 1B, the positions 1 through 8 are indicated by the numbers enclosed by a circle) are defined counterclockwise on the outer periphery of the beam on the parallel light portion, light rays passing the positions 1 through 8 are each subjected to convergence by the astigmatism element. The position 4 and the position 8 are located on a parting line dividing a beam section of the parallel light portion into two parts by a straight line that is in parallel to the curved surface direction, and the position 2 and the position 6 are located on a parting line dividing the beam section of the parallel light portion into two parts by a straight line that is in parallel to the flat surface direction. The positions 1, 3, 5, and 7 are located on mid positions of an arc portion of the outer perimeter respectively defined by the positions 2, 4, 6, and 8.

Light rays passing the positions 4 and 8 on the parallel light portion are converged into a focal line in the curved surface direction on the plane S1, and entered into the plane S0. Accordingly, the light rays passing the positions 4 and 8 on the parallel light portion pass the positions 4 and 8 shown in the section (c) of FIG. 1B on the plane S0. Similarly, the light rays passing the positions 1, 3, 5, and 7 on the parallel light portion are converged into a focal line in the curved surface direction on the plane S1, and entered into the plane S0. Accordingly, the light rays passing the positions 1, 3, 5, and 7 on the parallel light portion pass the positions 1, 3, 5, and 7 shown in the section (c) of FIG. 1B on the plane S0. On the other hand, the light rays passing the positions 2 and 6 on the parallel light portion are entered into the plane S0 without convergence into a focal line in the curved surface direction on the plane S1. Accordingly, the light rays passing the positions 2 and 6 on the parallel light portion pass the positions 2 and 6 shown in the section (c) of FIG. 1B on the plane S0.

Sections (a) through (d) in FIG. 2B are diagrams respectively showing beam configurations and light ray passing positions of stray light 1 on the parallel light portion, and the planes S1, S0, and S2. As shown in the section (a) of FIG. 2B, similarly to the signal light, in the case where eight positions 1 through 8 are defined on the outer periphery of stray light 1, light rays passing the eight positions 1 through 8 on the parallel light portion are converged into a focal line in the curved surface direction or a focal line in the flat surface direction, and entered into the plane S0. Accordingly, the light rays passing the positions 1 through 8 on the parallel light portion respectively pass the positions 1 through 8 shown in the section (c) of FIG. 2B on the plane S0.

Sections (a) through (d) in FIG. 3B are diagrams respectively showing beam configurations and light ray passing positions of stray light 2 on the parallel light portion, and the planes S1, S0, and S2. As shown in the section (a) of FIG. 3B, similarly to the signal light, in the case where eight positions 1 through 8 are defined on the outer periphery of stray light 2, light rays passing the eight positions 1 through 8 on the parallel light portion are entered into the plane S0, without convergence into a focal line in the curved surface direction or a focal line in the flat surface direction. Accordingly, the light rays passing the positions 1 through 8 on the parallel light portion respectively pass the positions 1 through 8 shown in the section (c) of FIG. 3B on the plane S0.

Figure 4:
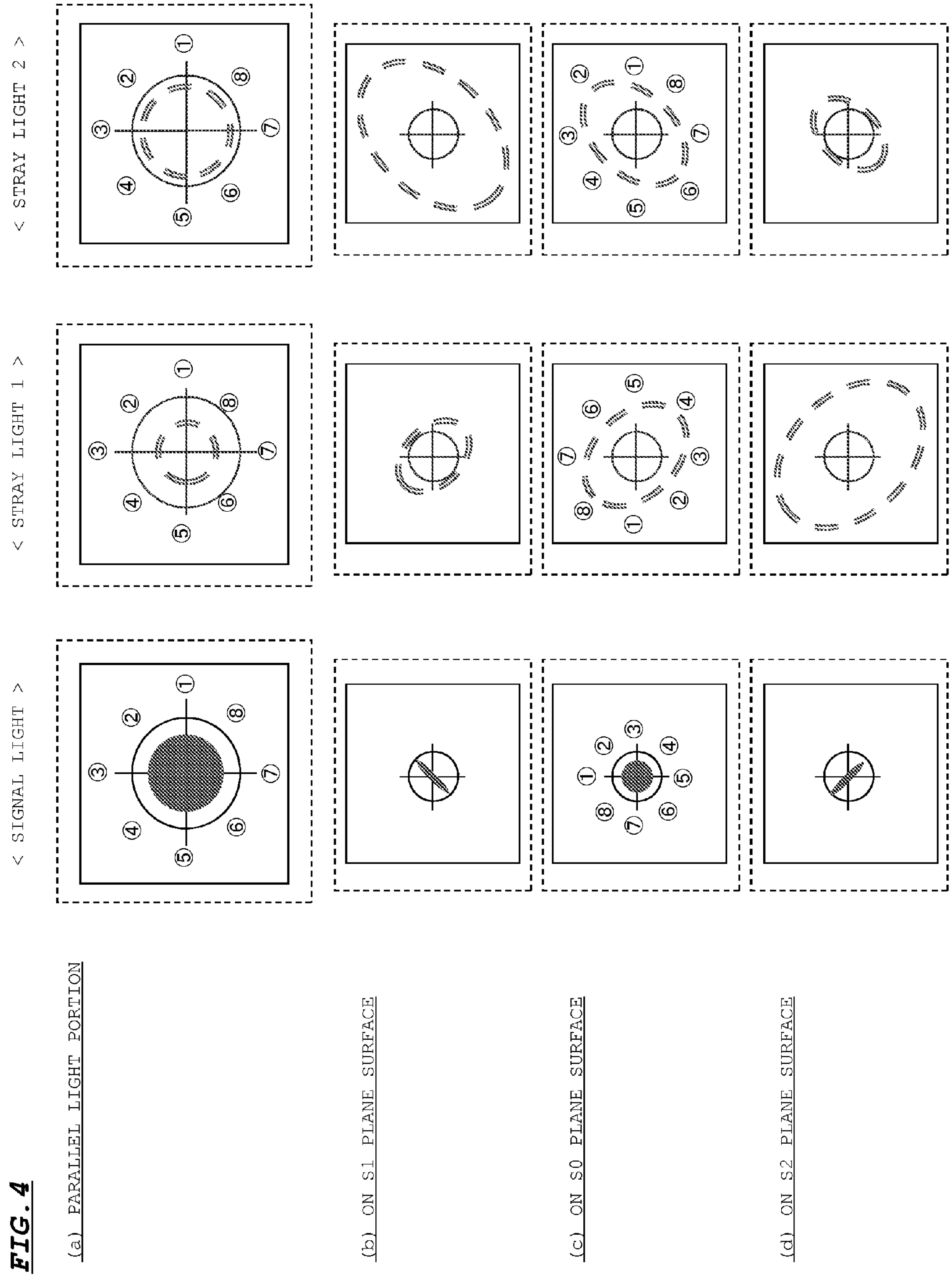
FIG. 4 is a diagram for describing the technical principle (as to how light rays propagate) in the embodiment.

FIG. 4 shows diagrams of the beam configurations and the light ray passing positions of signal light, stray light 1, and stray light 2 on the parallel light portion, and the planes S1, S0, and S2 in comparison with each other. As is obvious from the comparison between the diagrams in the section (c) of FIG. 4, light fluxes of signal light, stray light 1, and stray light 2 that have passed the position 1 on the parallel light portion respectively pass the different outer peripheral positions from each other on the plane S0. Likewise, light fluxes of signal light, stray light 1, and stray light 2 that have passed the positions 3, 4, 5, 7, and 8 on the parallel light portion respectively pass the different outer peripheral positions from each other on the plane S0. The light fluxes of signal light and stray light 2 that have passed the positions 2 and 6 on the parallel light portion respectively pass the corresponding same outer peripheral positions on the plane S0. In this case, the light fluxes of signal light and stray light 1 that have passed the positions 2 and 6 on the parallel light portion respectively pass the different outer peripheral positions from each other on the plane S0, and the light fluxes of stray light 1 and stray light 2 that have passed the positions 2 and 6 on the parallel light portion respectively pass the different outer peripheral positions from each other on the plane S0.

Next, a relation between an area dividing pattern of signal light, stray light 1, and stray light 2 on the parallel light portion, and an irradiation area of signal light, stray light 1, and stray light 2 on the plane S0 is investigated, considering the above phenomenon.

First, as shown in FIG. 5A, let it be assumed that signal light, stray light 1, and stray light 2 on the parallel light portion are each divided into four light flux areas A through D by two straight lines respectively inclined with respect to the flat surface direction and the curved surface direction by 45 degrees. This dividing pattern corresponds to an area dividing based on a conventional astigmatism method.

By the area dividing, signal light in the light flux areas A through D has a distribution on the plane S0 as shown in FIG. 5B due to the above phenomenon. Stray light 1 and stray light 2 in the light flux areas A through D respectively have distributions on the plane S0 as shown in FIGS. 5C and 5D due to the above phenomenon.

In this example, if the signal light, the stray light 1, and the stray light 2 on the plane S0 are extracted with respect to each of the light flux areas, distributions of the signal light, the stray light 1, and the stray light 2 are as shown in FIGS. 6A through 6D. In this case, the signal light in each of the light flux areas is necessarily superimposed on one of the stray light 1 and the stray light 2 in the corresponding same light flux area. Accordingly, if the signal light in each of the light flux areas is received by a sensor on the photodetector, at least the stray light 1 or the stray light 2 in the corresponding light flux area is simultaneously entered into the corresponding sensor, which may deteriorate a detection signal.

Figure 7A:
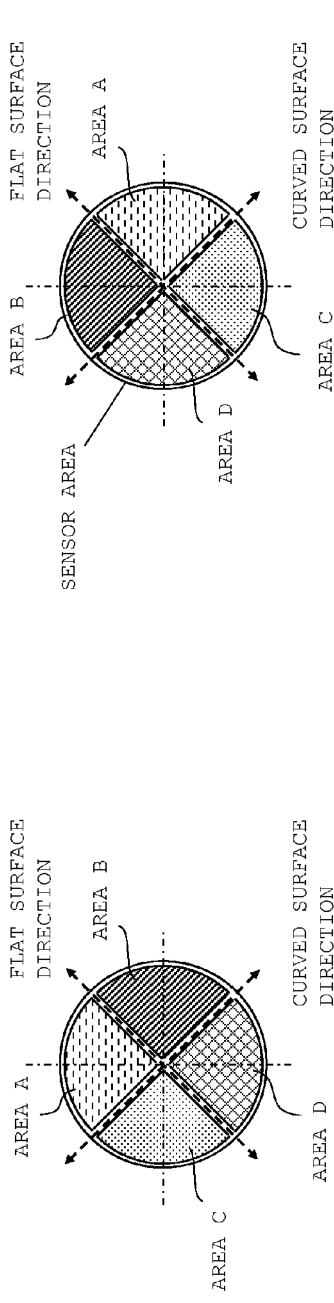
FIGS. 7A through 7D are diagrams for describing the technical principle (an area dividing pattern and a light flux distribution) in the embodiment.
Figure 7B:
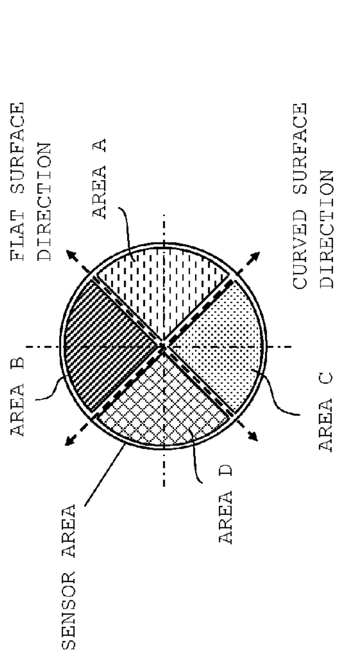
Figure 7C:
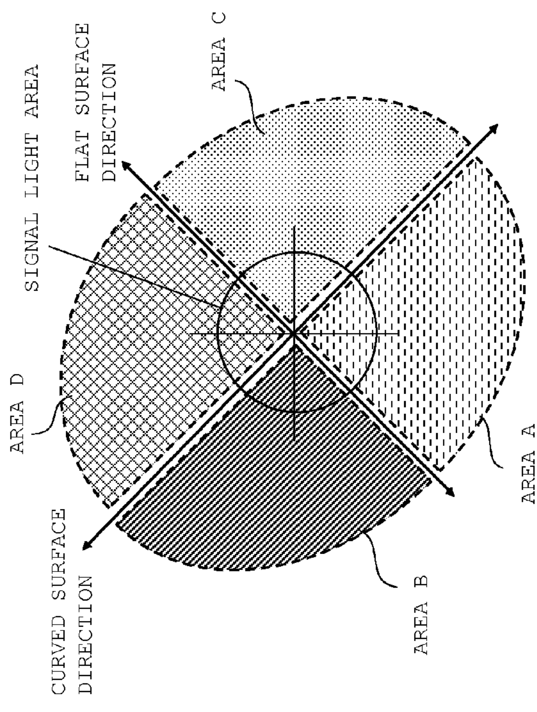
Figure 7D:
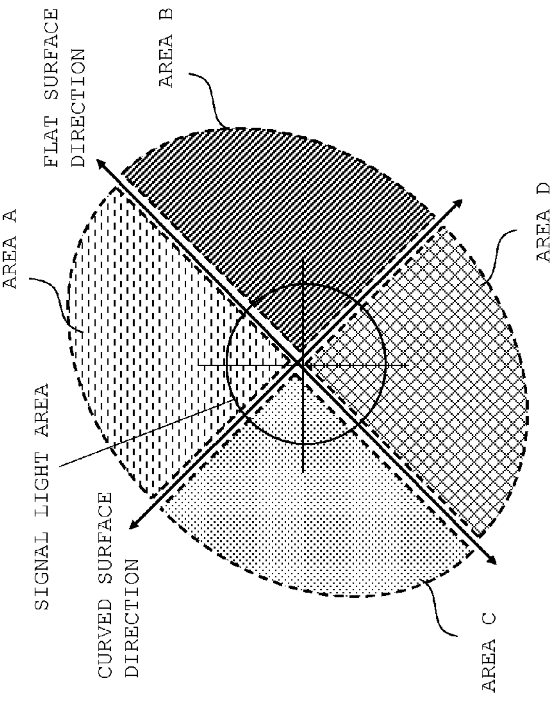

In contrast, as shown in FIG. 7A, let it be assumed that signal light, stray light 1, and stray light 2 on the parallel light portion are each divided into four light flux areas A through D by two straight lines, which are respectively in parallel to the flat surface direction and the curved surface direction. Then, signal light in the light flux areas A through D has a distribution on the plane S0 as shown in FIG. 7B due to the above phenomenon. Stray light 1 and stray light 2 in the light flux areas A through D respectively have distributions on the plane S0, as shown in FIGS. 7C and 7D due to the above phenomenon.

In this example, if the signal light, the stray light 1, and the stray light 2 on the plane S0 are extracted with respect to each of the light flux areas, distributions of the signal light, the stray light 1, and the stray light 2 are as shown in FIGS. 8A through 8D. In this case, the signal light in each of the light flux areas is not superimposed with any one of the stray light 1 and the stray light 2 in the corresponding light flux area.

Accordingly, if only the signal light is allowed to be received by a sensor, after the light fluxes (of signal light, stray light 1, and stray light 2) in each of the light flux areas are dispersed in different directions from each other, only the signal light is allowed to be entered into the corresponding sensor to thereby prevent incidence of stray light. Thus, deterioration of a detection signal resulting from stray light can be avoided.

As described above, dividing signal light, stray light 1, and stray light 2 each into four light flux areas A through D by two straight lines, which are respectively in parallel to the flat surface direction and the curved surface direction, and dispersing the light passing through the light flux areas A through D away from each other on the plane S0 enables to extract only the signal light. This embodiment is made based on the above principle.

Figure 9A:
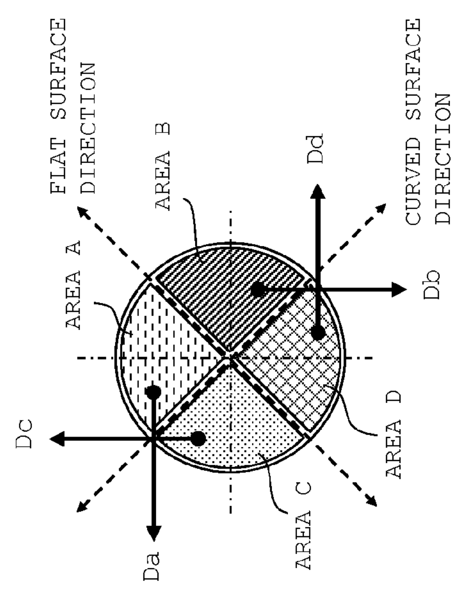
FIGS. 9A and 9B are diagrams for describing the technical principle (an angle changing function and a light flux distribution) in the embodiment.
Figure 9B:
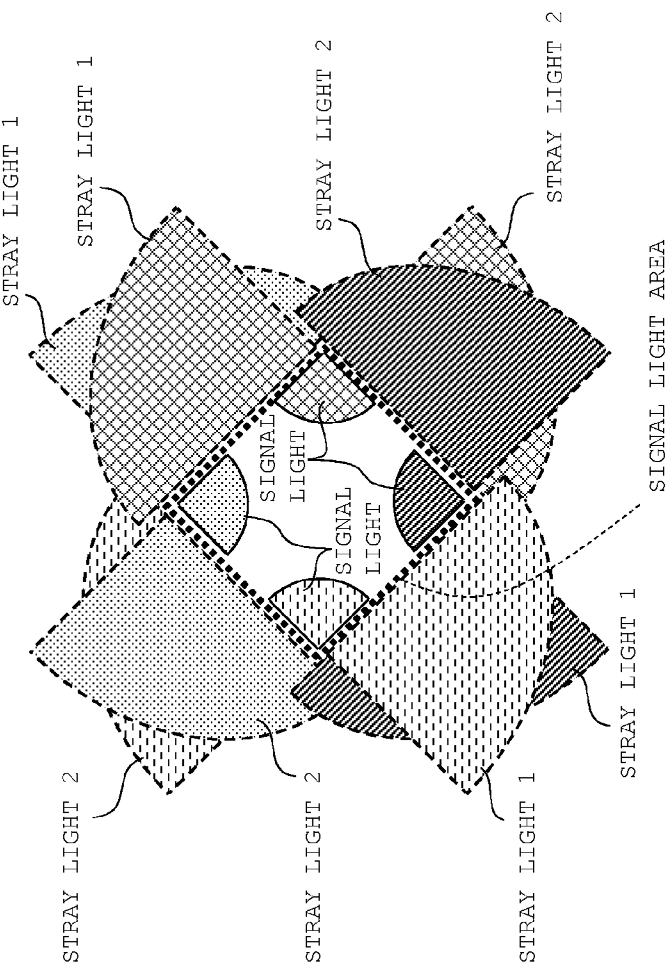

FIGS. 9A and 9B are diagrams showing distribution states of signal light, stray light 1, and stray light 2 on the plane S0, in the case where propagating directions of light fluxes (of signal light, stray light 1, and stray light 2) passing the four light flux areas A through D shown in FIG. 7A are changed from each other by a predetermined angle. In this example, as shown in FIG. 9A, the propagating directions of light fluxes (of signal light, stray light 1, and stray light 2) passing the four light flux areas A through D are respectively changed into directions Da, Db, Dc, and Dd by a predetermined angle amount a (not shown). The directions Da, Db, Dc, and Dd are inclined with respect to each of the flat surface direction and the curved surface direction by 45 degrees.

In this example, adjusting the angle amount a with respect to the directions Da, Db, Dc, and Dd enables to distribute the signal light, the stray light 1, and the stray light 2 in each of the light flux areas on the plane S0, as shown in FIG. 9B. As a result, as shown in FIG. 9B, a signal light area where only the signal light exists can be defined on the plane S0. Setting a sensor pattern of the photodetector on the signal light area allows only the signal light in each of the light flux areas to be received on the corresponding sensor.

Figure 10A:
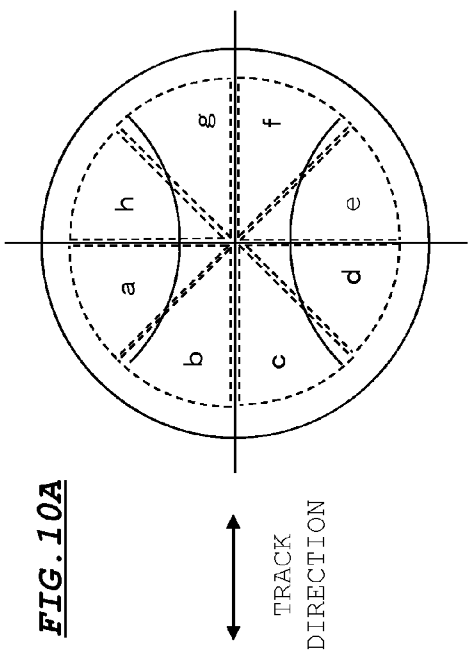
FIGS. 10A and 10B are diagrams showing a conventional method for arranging sensors.
Figure 10B:
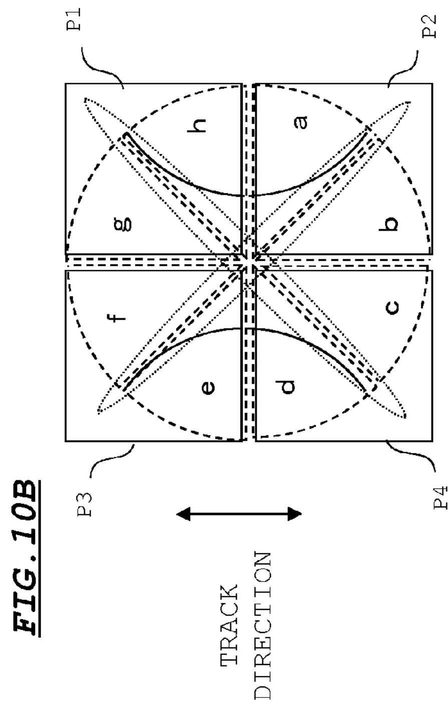
Figure 10C:
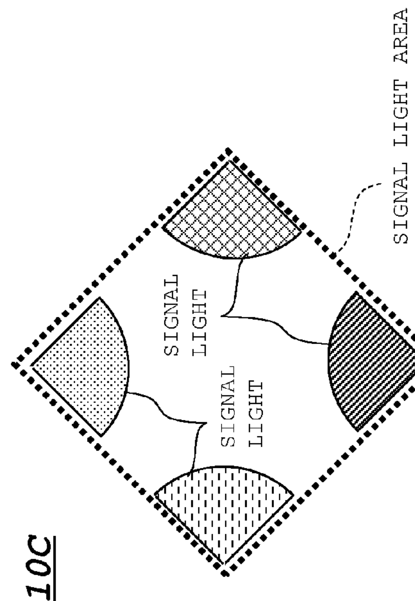
FIGS. 10C and 10D are diagrams showing a method for arranging sensors in the embodiment.
Figure 10D:
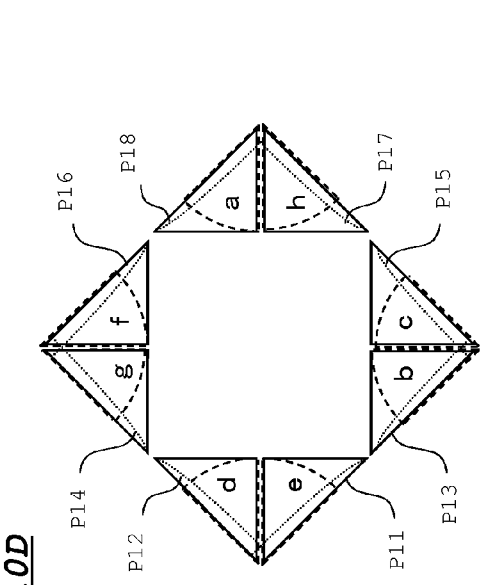

FIGS. 10A through 10D are diagrams for describing a method for arranging sensors. FIGS. 10A and 10B are diagrams showing a light flux dividing method and a sensor pattern based on a conventional astigmatism method. FIGS. 10C and 10D are diagrams showing a light flux dividing method and a sensor pattern based on the above principle. In this example, a track direction is inclined with respect to each of the flat surface direction and the curved surface direction by 45 degrees. To simplify the description, a light flux is divided into eight light flux areas "a" through "h" in FIGS. 10A and 10B. Diffraction images (track images) by a track groove are indicated by the solid lines, and beam configurations in an out-of-focus state are indicated by the dotted lines in FIGS. 10A and 10B.

In the conventional astigmatism method, sensors P1 through P4 (a four-division sensor) of a photodetector are set as shown in FIG. 10B. In this arrangement, assuming that detection signal components based on the light intensities of the light flux areas "a" through "h" are expressed by A through H, a focus error signal FE is obtained by computing: FE=(A+B+E+F)−(C+D+G+H), and a push-pull signal PP is obtained by computing: PP=(A+B+G+H)−(C+D+E+F).

On the other hand, in the distribution state shown in FIG. 9B, as described above, signal light is distributed in the state as shown in FIG. 10C within the signal light area. In this case, if the distribution of signal light passing the light flux areas "a" through "h" shown in FIG. 10A is superimposed on the distribution shown in FIG. 10C, the diagram shown in FIG. 10D is obtained. Specifically, the signal light passing the light flux areas "a" through "h" in FIG. 10A is guided to the light flux areas "a" through "h" shown in FIG. 10D on the plane S0 where the sensors of the photodetector is disposed.

Accordingly, setting the sensors P11 through P18 at the positions of the light flux areas "a" through "h" shown in FIG. 10D in the superimposed state shown in FIG. 10D enables to generate a focus error signal and a push-pull signal by performing the same computation as applied in FIG. 10B. Specifically, assuming that detection signals from the sensors which receive light fluxes in the light flux areas "a" through "h" are expressed by A through H, similarly to the arrangement shown in FIG. 10B, a focus error signal FE can be obtained by performing computation in accordance with the following equation (1):

$$FE=(A+B+E+F)-(C+D+G+H) \tag{1}$$

and a push-pull signal PP can be obtained by performing computation in accordance with the following equation (2):

$$PP=(A+B+G+H)-(C+D+E+F) \tag{2}$$

As described above, according to the above principle, dividing each of the signal light, the stray light 1, and the stray light 2 on the parallel light portion into four light flux areas A through D by two straight lines, which are respectively in parallel to the flat surface direction and the curved surface direction shown in FIG. 1A; dispersing the light passing the light flux areas A through D; and allowing the signal light in each of the light flux areas A through D after dispersion to be individually received by a two-division light receiving portion (a two-division sensor) enable to generate a focus error signal and a push-pull signal (a tracking error signal) by performing the same computation as applied to the process based on the conventional astigmatism method.

As described above, according to the above principle, a push-pull signal PP is acquired by the computation expressed by the equation (2), using the sensor pattern shown in FIG. 10D. However, if the positions of the sensors P11 through P18 are displaced from a normalized position in a parallel direction to the light receiving surface, a DC component may be superimposed on a push-pull signal (a tracking error signal) resulting from the positional displacement. In view of this, the equation (2) may be modified into the following equation (3).

$$PP=\{(A+H)-(D+E)\}+(B+G)-(C+F) \tag{3}$$

Figure 11B:
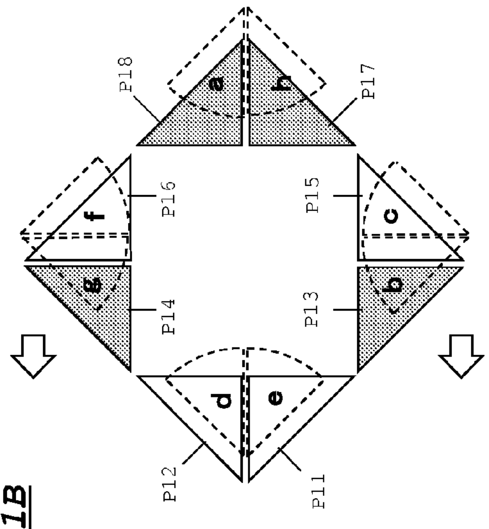
FIGS. 11A through 11C are diagrams showing a relation between a displacing direction of sensors, and an irradiation state of signal light with respect to each sensing portion in the embodiment.
Figure 11A:
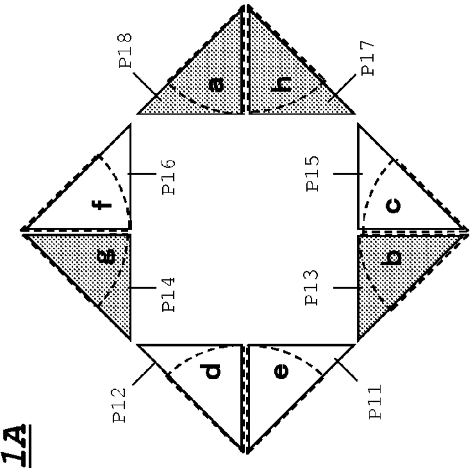
Figure 11C:
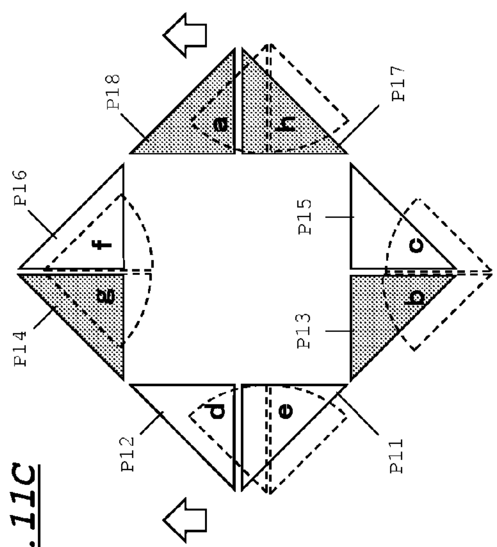

FIGS. 11A through 11C are diagrams showing a relation between a displacing direction of sensors, and an irradiation state of signal light on each sensor. FIGS. 11A through 11C show superimposed states of signal light in the light flux areas "a" through "h" in a case that laser light is in an on-focus state on a targeted recording layer.

FIG. 11A is a diagram showing a state that the sensors P11 through P18 are properly positioned on the signal light area shown in FIG. 10C. As shown in FIG. 11B, if the sensors P11 through P18 are displaced in leftward direction from the state shown in FIG. 11A, the degree of overlapping the light flux areas "a" through "h" with respect to the sensors P11 through P18 is changed.

In this example, the irradiation area of signal light (the light flux areas "e" and "d") with respect to the sensors P11 and P12, and the irradiation area of signal light (the light flux areas "h" and "a") with respect to the sensors P17 and P18 are reduced substantially with the same rate. Accordingly, the term {(A+H)-(D+E)} in the equation (3) becomes substantially zero in a state (an on-track state) that laser light is accurately positioned on a track on a targeted recording layer.

On the other hand, the irradiation area of signal light (the light flux areas "c" and "f") with respect to the sensors P15 and P16 is increased, as compared with the irradiation area of signal light (the light flux areas "b" and "g") with respect to the sensors P13 and P14. Accordingly, the term $\{(B+G)-(C+F)\}$ in the equation (3) becomes a minus value. As a result, a DC component is generated in the push-pull signal PP (a tracking error signal).

The foregoing description has been made about a case that the positions of the sensors are displaced in leftward direction in FIG. 11A. In the case where the positions of the sensors are displaced in rightward direction in FIG. 11A, the term $\{(B+G)-(C+F)\}$ in the equation (3) becomes a plus value. As a result, a DC component is generated in the push-pull signal PP (a tracking error signal).

As shown in FIG. 11C, in the case where the positions of the sensors are displaced in upward direction in FIG. 11A, the reduction rate of the irradiation area of signal light is the same between the combination of the sensors P11 and P12, and the combination of the sensors P17 and P18. Further, the reduction rate of the irradiation area of signal light is substantially the same between the combination of the sensors P13 and P14, and the combination of the sensors P15 and P16. Accordingly, there is no or less likelihood that a DC component may be generated in the push-pull signal PP (a tracking error signal). Similarly, in the case where the positions of the sensors are displaced in downward direction in FIG. 11C, there is no or less likelihood that a DC component may be generated in the push-pull signal PP (a tracking error signal).

Figure 12A:
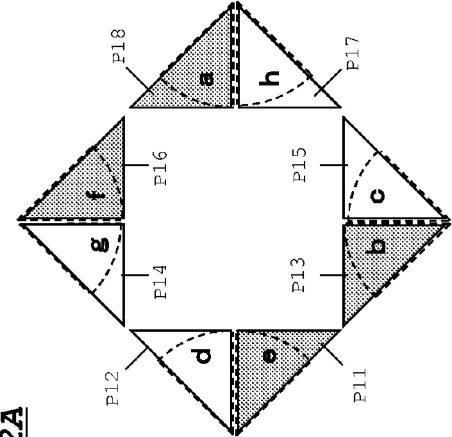
FIGS. 12A through 12C are diagrams showing the relation between a displacing direction of a sensors, and an irradiation state of signal light with respect to each sensing portion in the embodiment.
Figure 12B:
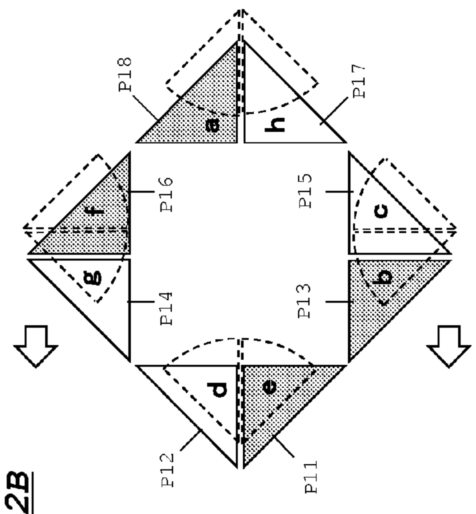
Figure 12C:
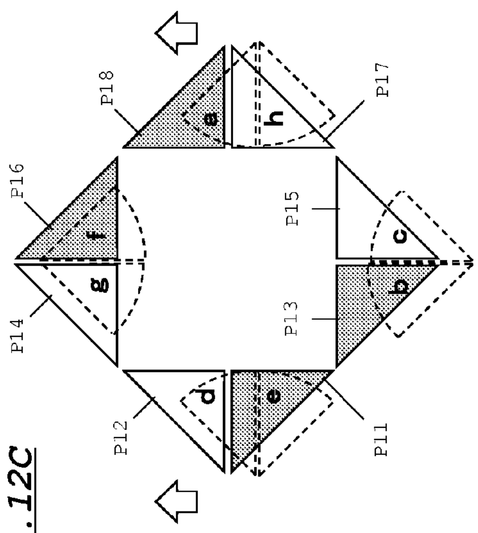

FIGS. 12B and 12C are diagrams respectively showing an influence on a focus error signal, in the case where the positions of the sensors are displaced from the normalized position shown in FIG. 12A in leftward direction and upward direction in FIG. 12A. Unlike the case of a push-pull signal, there is no or less likelihood that a DC component may be generated in the focus error signal, resulting from positional displacements of the sensors in any of the upward, downward, leftward, and rightward directions.

Specifically, as shown in FIG. 12B, in the case where the positions of the sensors are displaced in leftward direction in FIG. 12A, since the reduction rate of the irradiation area of signal light is substantially the same between the combination of the sensors P11, P13, P16, and P18, and the combination of the sensors P12, P14, P15, and P17, there is no or less likelihood that a DC component may be generated in the focus error signal FE, resulting from the positional displacement. Similarly, in the case where the positions of the sensors are displaced in rightward direction in FIG. 12A, there is no or less likelihood that a DC component may be generated in the focus error signal FE.

Further, as shown in FIG. 12C, in the case where the positions of the sensors are displaced in upward direction in FIG. 12A, since the reduction rate of the irradiation area of signal light is substantially the same between the combination of the sensors P11, P13, P16, and P18, and the combination of the sensors P12, P14, P15, and P17, there is no or less likelihood that a DC component may be generated in the focus error signal FE, resulting from the positional displacement. Similarly, in the case where the positions of the sensors are displaced in downward direction in FIG. 12A, there is no or less likelihood that a DC component may be generated in the focus error signal FE.

In this way, in the case where the sensor pattern is configured as shown in FIG. 10D based on the above principle, and the focus error signal FE and the push-pull signal PP are obtained by the equations (1) and (2) based on the above principle, only in the case where the positions of the sensors are displaced in leftward or rightward direction in FIG. 11B, a DC component is generated in a push-pull signal (a tracking error signal).

Figure 13:
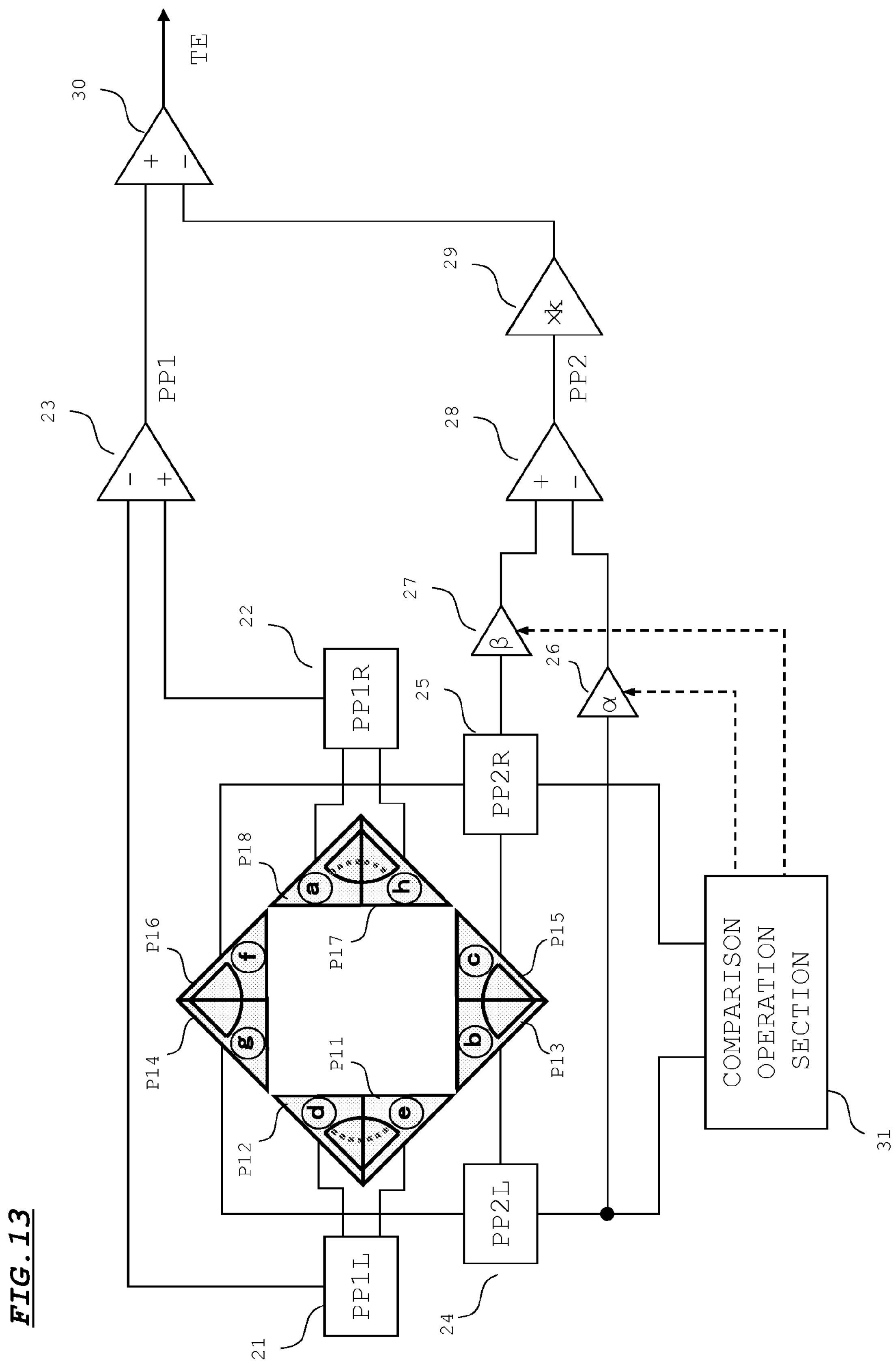
FIG. 13 is a diagram showing a configuration of a computing circuit for generating a push-pull signal in the embodiment.

FIG. 13 is a diagram showing a circuit configuration for suppressing a DC component in a push-pull signal (a tracking error signal). As shown in FIG. 13, a circuit for generating a push-pull signal includes adder circuits 21, 22, 24, and 25, subtraction circuits 23, 28, and 30, gain circuits 26 and 27, a multiplication circuit 29, and a comparison operation section 31. In FIG. 13, the gain circuits 26 and 27, and the comparison operation section 31 correspond to a gain adjusting circuit in the claimed invention.

The adder circuit 21 sums up output signals from the sensors P11 and P12, and outputs a signal depending on the light amount of left signal light out of the left signal light and the right signal light. The adder circuit 22 sums up output signals from the sensors P17 and P18, and outputs a signal depending on the light amount of right signal light out of the left signal light and the right signal light. The subtraction circuit 23 computes a difference between the output signals from the adder circuits 21 and 22, and generates a signal PP1 based on a difference in light amount between the left signal light and the right signal light.

The adder circuit 24 sums up output signals from the sensors P13 and P14, and outputs a signal depending on the light amount of left sides of the upper signal light and the lower signal light. The adder circuit 25 sums up output signals from the sensors P15 and P16, and outputs a signal depending on the light amount of right sides of the upper signal light and the lower signal light. The gain circuits 26 and 27 respectively multiply the outputs from the adder circuits 24 and 25 by $\alpha$ and $\beta$ under the control of the comparison operation section 31. The subtraction circuit 28 computes a difference between the output signals from the gain circuits 26 and 27, and generates a signal PP2 based on the right-left partiality of the upper signal light and the lower signal light.

The multiplication circuit 29 outputs, to the subtraction circuit 30, a signal obtained by multiplying the signal PP2 to be outputted from the subtraction circuit 28 by a variable "k". In this example, the variable "k" is set to a value capable of suppressing a DC component in a push-pull signal (a tracking error signal) resulting from lens shift. The variable "k" is manually or automatically adjusted to an optimum value, using a test disc at the time of shipment of a product. A concrete method for setting the variable "k" is disclosed in the U.S. patent application Ser. No. 12/567,299 filed by the applicant of the present application.

The subtraction circuit 30 subtracts a signal to be inputted from the multiplication circuit 29, from the signal PP1 to be inputted from the subtraction circuit 23, and outputs a signal after the subtraction, as a push-pull signal (a tracking error signal).

The comparison operation section 31 adjusts the gains (magnifications) $\alpha$ and $\beta$ of the gain circuits 26 and 27, based on the signals from the adder circuits 24 and 25. The comparison operation section 31 corrects imbalance of the signals from the adder circuits 24 and 25 as follows, in a state that optical axes of an objective lens and laser light are not displaced (without lens shift) immediately after a focus pull-in operation is performed with respect to a disc.

Specifically, assuming that signals to be outputted from the adder circuits 21, 22, 24, and 25 are respectively PP1L, PR1R, PP2L, and PP2R, the comparison operation section 31 at first performs computation in accordance with the following equation (4), using the signals PP2L and PP2R to obtain a target value PP2O for correcting imbalance.

$$PP2O=(PP2L+PP2R)/2 \tag{4}$$

Next, the comparison operation section 31 performs computation in accordance with the following equation (5) and (6), using the target value PP2O to obtain gains (magnifications) α and β, and set the gains (magnifications) α and β in the gain circuits 26, and 27, respectively.

$$\alpha=PP2O/PP2L \quad (5)$$

$$\beta=PP2O/PP2R \quad (6)$$

Setting the gains (magnifications) as described above enables to correct imbalance of signals from the adder circuits 24 and 25, resulting from positional displacements of the sensors in rightward or leftward direction, which has been described referring to FIG. 11B. This enables to suppress a DC component in a push-pull signal (a tracking error signal), resulting from positional displacements of the sensors.

In this example, the target value PP2O for correcting imbalance is obtained by performing the equation (4). Alternatively, the target value PP2O may be held in advance in the comparison operation section 31, as an initial value.

Further alternatively, setting the gains (magnifications) α and β may be performed at the time of performing a focus pull-in operation with respect to a disc, other than at the time of shipment of a product i.e. the optical disc device. Further alternatively, the gains (magnifications) α and β may be set at a timing after lapse of a predetermined period from the time of shipment of a product, or in response to operation/designation by a user.

A signal computing circuit shown in FIG. 13 may be disposed in the optical pickup device, or in the optical disc device loaded with the optical pickup device. Further alternatively, a part of a circuit portion constituting the signal computing circuit may be disposed in the optical pickup device. For instance, the entirety of the computing circuit shown in FIG. 13 may be disposed in the optical pickup device or the optical disc device. Further alternatively, the computing circuit may be divided into two circuit portions, and the two circuit portions may be disposed in the optical pickup device and the optical disc device individually by e.g. disposing a circuit portion including a circuit element for generating the signals PP1 and PP2 in the optical pickup device, and disposing a circuit portion posterior to the circuit element in the optical disc device.

EXAMPLE

In this section, an example of the invention based on the above principle is described.

Figure 14:
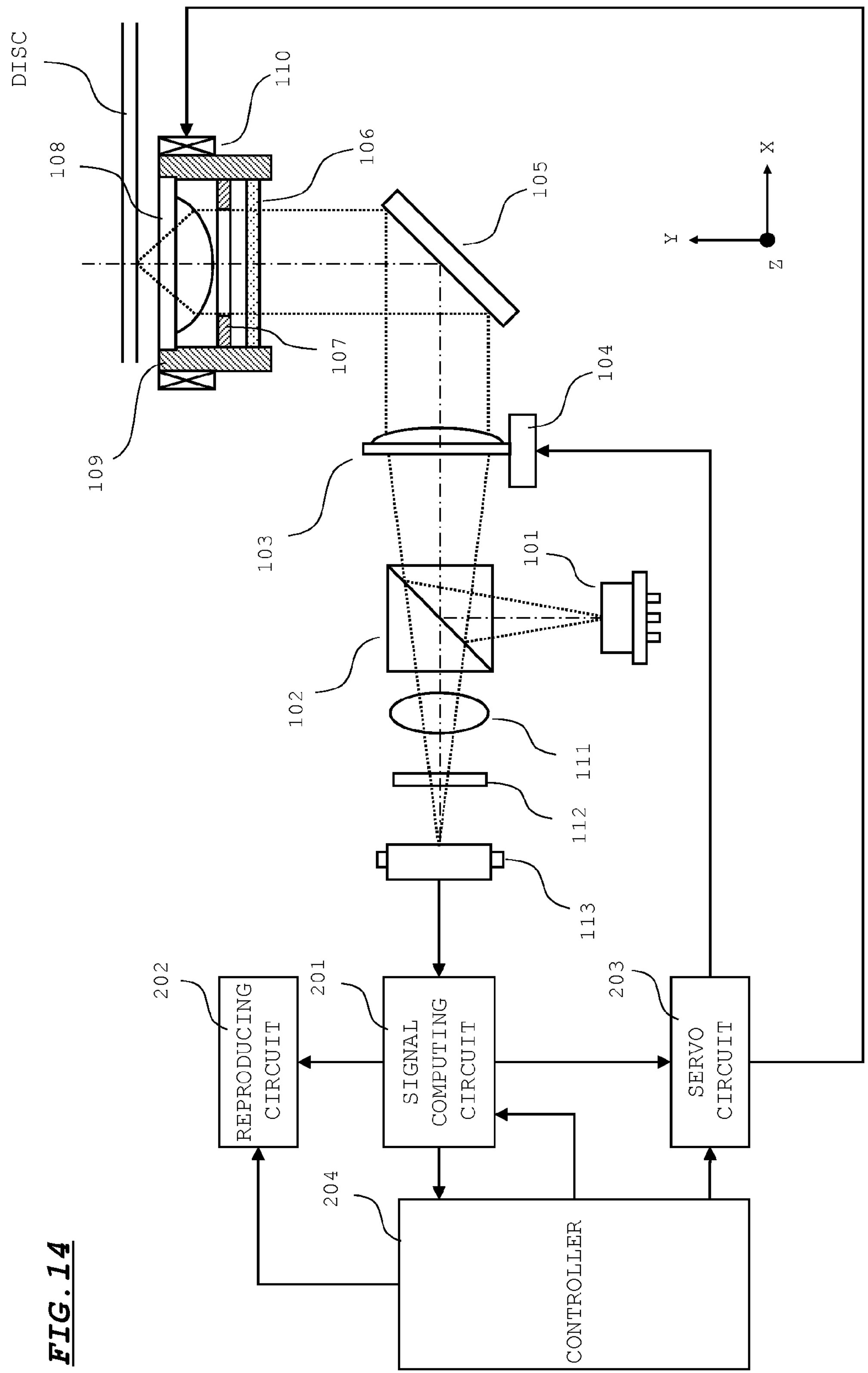
FIG. 14 is a diagram showing essential parts of an arrangement of an optical system in an optical pickup device, and an optical disc device, as an example of the invention.

FIG. 14 is a diagram showing an optical system of an optical pickup device, and essential circuits of an optical disc device, as an example of the invention. A disc in FIG. 14 is formed by laminating a plurality of recording layers.

As shown in FIG. 14, the optical system of the optical pickup device includes a semiconductor laser 101, a polarized beam splitter 102, a collimator lens 103, a lens actuator 104, a rise-up mirror 105, a quarter wavelength plate 106, an aperture 107, an objective lens 108, a holder 109, an objective lens actuator 110, a detection lens 111, an angle adjuster 112, and a photodetector 113.

The semiconductor laser 101 emits laser light of a predetermined wavelength. The polarized beam splitter 102 substantially totally reflects laser light (S-polarized light) to be entered from the semiconductor laser 101, and substantially totally transmits laser light (P-polarized light) to be entered from the collimator lens 103. The collimator lens 103 converts laser light to be entered from the polarized beam splitter 102 into parallel light.

The lens actuator 104 displaces the collimator lens 103 in an optical axis direction in accordance with a servo signal to be inputted from a servo circuit 203. Accordingly, aberration in the laser light is corrected. The rise-up mirror 105 reflects the laser light entered from the collimator lens 103 in a direction toward the objective lens 108.

The quarter wavelength plate 106 converts laser light directed to the disc into circularly polarized light, and converts reflection light from the disc into linearly polarized light orthogonal to a polarization direction toward the disc. Accordingly, the laser light reflected on the disc is transmitted through the polarized beam splitter 102.

The aperture 107 adjusts the beam shape of laser light into a circular shape to properly set the effective diameter of laser light with respect to the objective lens 108. The objective lens 108 is so designed as to properly converge laser light onto a targeted recording layer in the disc. The holder 109 integrally holds the quarter wavelength plate 106, the aperture 107, and the objective lens 108. The objective lens actuator 110 is constituted of a conventional well-known electromagnetic drive circuit. A coil portion such as a focus coil of the electromagnetic drive circuit is mounted on the holder 109.

The detection lens 111 imparts astigmatism to reflection light from the disc. Specifically, the detection lens 111 corresponds to the astigmatism element shown in FIG. 1A. The detection lens 111 is disposed at such a position that the flat surface direction and the curved surface direction are each inclined with respect to a track image from the disc by 45 degrees.

The angular adjuster 112 changes the propagating direction of laser light entered from the detection lens 111 in the manner described referring to FIG. 9A. Specifically, the angular adjuster 112 changes propagating directions of light fluxes passing the light flux areas A through D in FIG. 9A, out of the laser light entered into the angular adjuster 112, into the directions Da through Dd by the predetermined angle amount α. The angle amount α is so defined that the distribution state of signal light, stray light 1, and stray light 2 on the plane S0 coincides with the distribution shown in FIG. 9B.

The photodetector 113 has the sensors as shown in FIG. 10D. The photodetector 113 is disposed in such a manner that the sensors are positioned at the plane S0 in FIG. 1A. The photodetector 113 is provided with the eight sensors P11 through P18 or eight sensors shown in FIG. 10D. These sensors P11 through P18 respectively receive light fluxes passing the light flux areas “a” through “h” in FIG. 10D.

The signal computing circuit 201 performs computation with respect to detection signals outputted from the eight sensors of the photodetector 113 in the manner as described referring to FIG. 10D, and generates a focus error signal. Further, the signal computing circuit 201 sums up detection signals outputted from the eight sensors, and generates a reproduction RF signal. The signal computing circuit 201 includes the computing circuit shown in FIG. 13, performs computation with respect to the detection signals outputted from the eight sensors of the photodetector 113, using the computing circuit, and generates a push-pull signal (a tracking error signal). The focus error signal and the push-pull signal are transmitted to the servo circuit 203, and the reproduction RF signal is transmitted to a reproducing circuit 202 and the servo circuit 203.

The reproducing circuit 202 demodulates the reproduction RF signal inputted from the signal computing circuit 201, and generates reproduction data. The servo circuit 203 generates a tracking servo signal and a focus servo signal based on the push-pull signal and the focus error signal inputted from the signal computing circuit 201, and outputs the tracking servo signal and the focus servo signal to the objective lens actuator 110. The servo circuit 203 also outputs a servo signal to the lens actuator 104 to optimize the quality of the reproduction RF signal inputted from the signal computing circuit 201. A controller 204 controls the respective parts in accordance with a program incorporated in an internal memory provided in the controller 204.

Figure 15A:
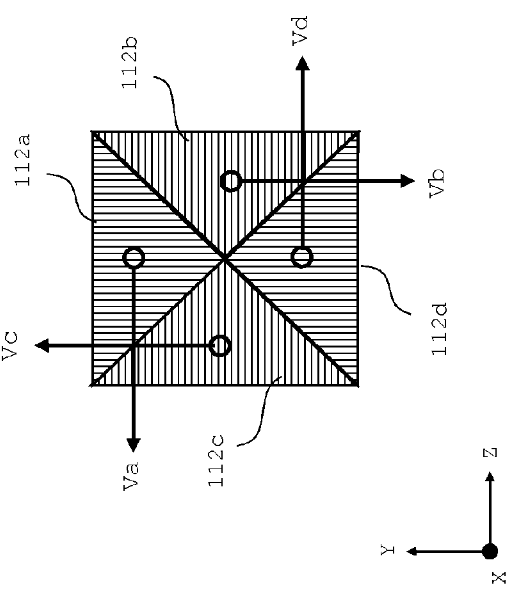
FIGS. 15A through 15C are diagrams showing arrangement examples of an angle adjuster in the inventive example.
Figure 15B:
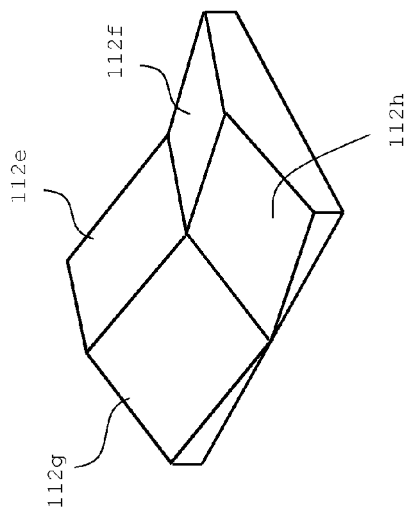
Figure 15C:
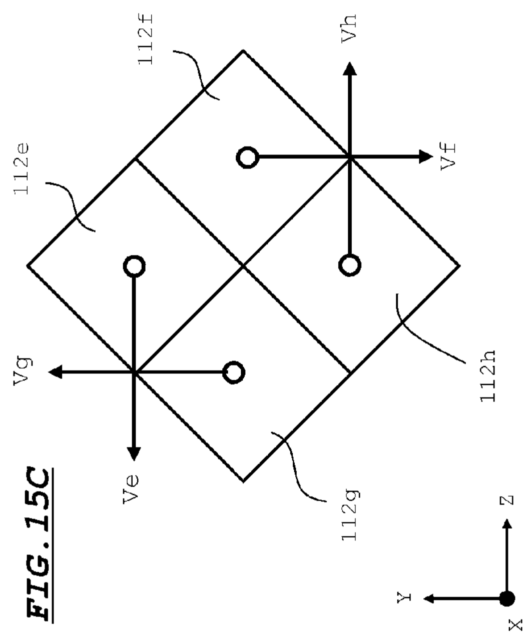

FIGS. 15A through 15C are diagrams showing arrangement examples of the angle adjuster 112. FIG. 15A shows an arrangement example, wherein the angle adjuster 112 is constituted of a hologram element having a diffraction pattern, and FIGS. 15B and 15C show an arrangement example, wherein the angle adjuster 112 is constituted of a polygonal prism.

In the arrangement example shown in FIG. 15A, the angle adjuster 112 is made of a transparent plate substantially having a square shape in plan view, and a hologram pattern is formed on a light incident surface of the angle adjuster 112. As shown in FIG. 15A, the light incident surface is divided into four hologram areas 112*a* through 112*d*. The angle adjuster 112 is disposed at a position posterior to the detection lens 111 so that laser light (signal light, stray light 1, and stray light 2) that has passed the light flux areas A through D shown in FIG. 9A is allowed to be entered into the hologram areas 112*a* through 112*d*, respectively.

The hologram areas 112*a* through 112*d* diffract the incident laser light (signal light, stray light 1, and stray light 2) in directions Va through Vd, respectively. The directions Va through Vd are aligned with the directions Da through Dd shown in FIG. 9A. Accordingly, the hologram areas 112*a* through 112*d* change the propagating directions of laser light (signal light, stray light 1, and stray light 2) entered from the detection lens 111 into the directions Da through Dd shown in FIG. 9A, respectively, by diffraction. The diffraction angles with respect to the hologram areas 112*a* through 112*d* are identical to each other.

In this example, the diffraction angles are so adjusted as to distribute the laser light (signal light, stray light 1, and stray light 2) that has passed the hologram areas 112*a* through 112*d* in the state as shown in FIG. 9B on the plane S0 in FIG. 1A. Accordingly, as described above, disposing the light receiving surface of the photodetector 113 having the sensors pattern shown in FIG. 10D on the plane S0 enables to properly receive the corresponding signal light by the eight sensors.

The diffraction efficiencies of the hologram areas 112*a* through 112*d* are made identical to each other. In the case where a hologram to be formed on the hologram areas 112*a* through 112*d* has a stepped pattern, the diffraction efficiency is adjusted depending on the number of steps and the height per step of the hologram pattern, and the diffraction angle is adjusted depending on the pitch of the hologram pattern. In this example, the number of steps and the height per step of the hologram pattern are so determined that the diffraction efficiency of a predetermined diffraction order is set to an intended value. Further, the pitch of the hologram pattern is so adjusted that the distribution as shown in FIG. 9B is given by the diffraction angle corresponding to the diffraction order.

It is possible to blaze a hologram to be formed on the hologram areas 112*a* through 112*d*. The modification is advantageous in increasing the diffraction efficiency, as compared with a case that a stepped pattern is formed on a hologram.

In the arrangement example shown in FIG. 15B, the angle adjuster 112 is made of a transparent member, wherein a light exit surface is flat, and a light incident surface has four areas inclined in different directions from each other. FIG. 15C is a diagram of the angle adjuster 112 shown in FIG. 15B, viewed from the side of the light incident surface. As shown in FIG. 15C, the light incident surface of the angle adjuster 112 has four tilted surfaces 112*e* through 112*h*. When light rays are entered into the tilted surfaces 112*e* through 112*h* from the side of the light incident surface in parallel to X-axis, the propagating directions of the incident light are respectively changed into directions Ve through Vh shown in FIG. 15C by refraction of the incident light into the tilted surfaces 112*e* through 112*h*. In this example, the refraction angles with respect to the tilted surfaces 112*e* through 112*h* are identical to each other.

The angle adjuster 112 shown in FIG. 15B is disposed at a position posterior to the detection lens 111 so that laser light (signal light, stray light 1, and stray light 2) that has passed the light flux areas A through D shown in FIG. 9A is entered into the tilted surfaces 112*e* through 112*h*, respectively. Disposing the angle adjuster 112 in the above manner enables to make the refraction directions Ve through Vh with respect to the tilted surfaces 112*e* through 112*h* coincide with the direction Da through Dd shown in FIG. 9A. Accordingly, the tilted surfaces 112*e* through 112*h* change the propagating directions of laser light (signal light, stray light 1, and stray light 2) entered from the detection lens 111 into the directions Da through Dd shown in FIG. 9A by a predetermined angle, by refraction.

In this example, the refraction angles with respect to the tilted surfaces 112*e* through 112*h* are so adjusted as to distribute the laser light (signal light, stray light 1, and stray light 2) that has passed the tilted surfaces 112*e* through 112*h* in the state as shown in FIG. 9B on the plane S0 in FIG. 1A. Accordingly, disposing the photodetector 113 having the sensor pattern shown in FIG. 10D on the plane S0 enables to properly receive the corresponding signal light by the eight sensors. Since the refraction function has significantly small wavelength dependence, as compared with the diffraction function, the arrangement using the refraction function has a higher compatibility with respect to a wavelength change of a light source, or a multiple wavelength light source.

In the arrangement example shown in FIG. 15A, the hologram areas 112*a* through 112*d* are provided only with the angle-changing diffraction function of changing the propagating direction of laser light by a predetermined angle. Alternatively, a hologram pattern of imparting astigmatism by the detection lens 111 simultaneously with the angle changing function may be formed on the hologram areas 112*a* through 112*d*. Further alternatively, a hologram pattern having an angle changing function may be formed on the light incident surface of the angle adjuster 112, and a hologram pattern having astigmatism function may be formed on the light exit surface of the angle adjuster 112.

Similarly to the above, in the angle adjuster 112 shown in FIG. 15B, a lens surface for imparting astigmatism may be formed on the light exit surface of the angle adjuster 112; or the tilted surfaces 112*e* through 112*h* may be formed into a curved surface shape so that the tilted surfaces 112*e* through 112*h* are provided with a lens function of imparting astigmatism. The modification enables to eliminate the detection lens 111 to thereby reduce the number of parts and the cost.

As described above, in the foregoing example, there is no likelihood that signal light reflected on a targeted recording layer of the recording layers formed in a disc, and stray light 1 and stray light 2 reflected on a recording layer on and under the targeted recording layer may be superimposed one over the other on the light receiving surface (the plane S0 where the spot of signal light becomes a least circle of confusion in an on-focus state) of the photodetector 113. Specifically, the distribution of signal light, stray light 1, and stray light 2 on the light receiving surface (plane S0) can be made in the state as shown in FIG. 9B. Thus, disposing the sensors of the sensor pattern shown in FIG. 10D on the signal light area shown in FIG. 9B enables to receive only the corresponding signal light on the sensors P11 through P18. This enables to suppress deterioration of a detection signal resulting from stray light. Further, since the signal light area has a square shape as shown in FIG. 9B, the sensors constituting the sensor pattern can be easily arranged, and the arrangement area of the sensors can be reduced.

In addition to the above, in the foregoing example, a push-pull signal (a tracking error signal) is generated by the circuit configuration shown in FIG. 13. Accordingly, as described above, an offset (DC component) resulting from positional displacements of the sensors, which is included in a push-pull signal (a tracking error signal), can be effectively suppressed. Further, an offset (DC component) resulting from a positional displacement due to a change with time can be effectively suppressed, in addition to an offset (DC component) resulting from an initial positional displacement of the sensors.

The above effects can be obtained by merely disposing the angle adjuster 112 on the optical path of laser light reflected on a disc, i.e. between the detection lens 111 and the photodetector 113 in the arrangement of FIG. 14. Accordingly, in the foregoing example, an influence by stray light can be effectively removed with a simplified arrangement, and an offset (DC component) included in a push-pull signal (a tracking error signal) can be suppressed.

Figure 16:
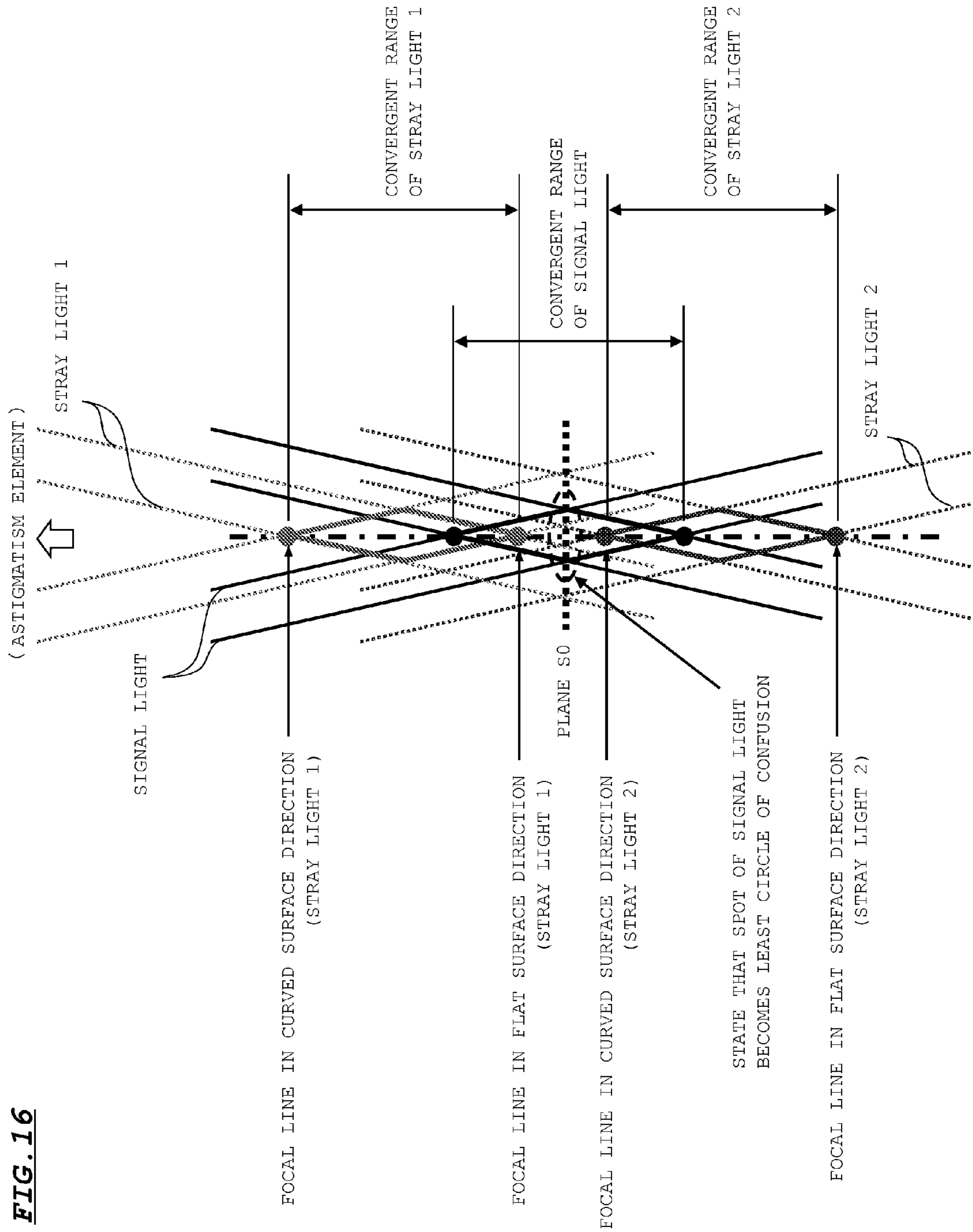
FIG. 16 is a diagram showing a preferable range of the technical principle to be applied to the inventive example and the invention.

The effect of removing stray light based on the above principle is obtained, as shown in FIG. 16, when the focal line position of stray light 1 in the flat surface direction is closer to the astigmatism element with respect to the plane S0 (a plane where the beam spot of signal light becomes a least circle of confusion), and the focal line position of stray light 2 in the curved surface direction is away from the astigmatism element with respect to the plane S0. Specifically, as far as the above relation is satisfied, the distribution of signal light, stray light 1, and stray light 2 can be made in the states as shown in FIGS. 8A through 8D, which enables to avoid a likelihood that signal light, stray light 1, and stray light 2 may be superimposed one over the other on the plane S0. In other words, as far as the above relation is satisfied, even if the focal line position of stray light 1 in the flat surface direction is moved closer to the plane S0 than the focal line position of signal light in the curved surface direction, or even if the focal line position of stray light 2 in the curved surface direction is moved closer to the plane S0 than the focal line position of signal light in the flat surface direction, the effect of the invention and the example based on the above principle can be obtained.

In the foregoing, an example of the invention has been described. The invention is not limited to the foregoing example, and the embodiment of the invention may be modified in various ways other than the above.

Figure 17:
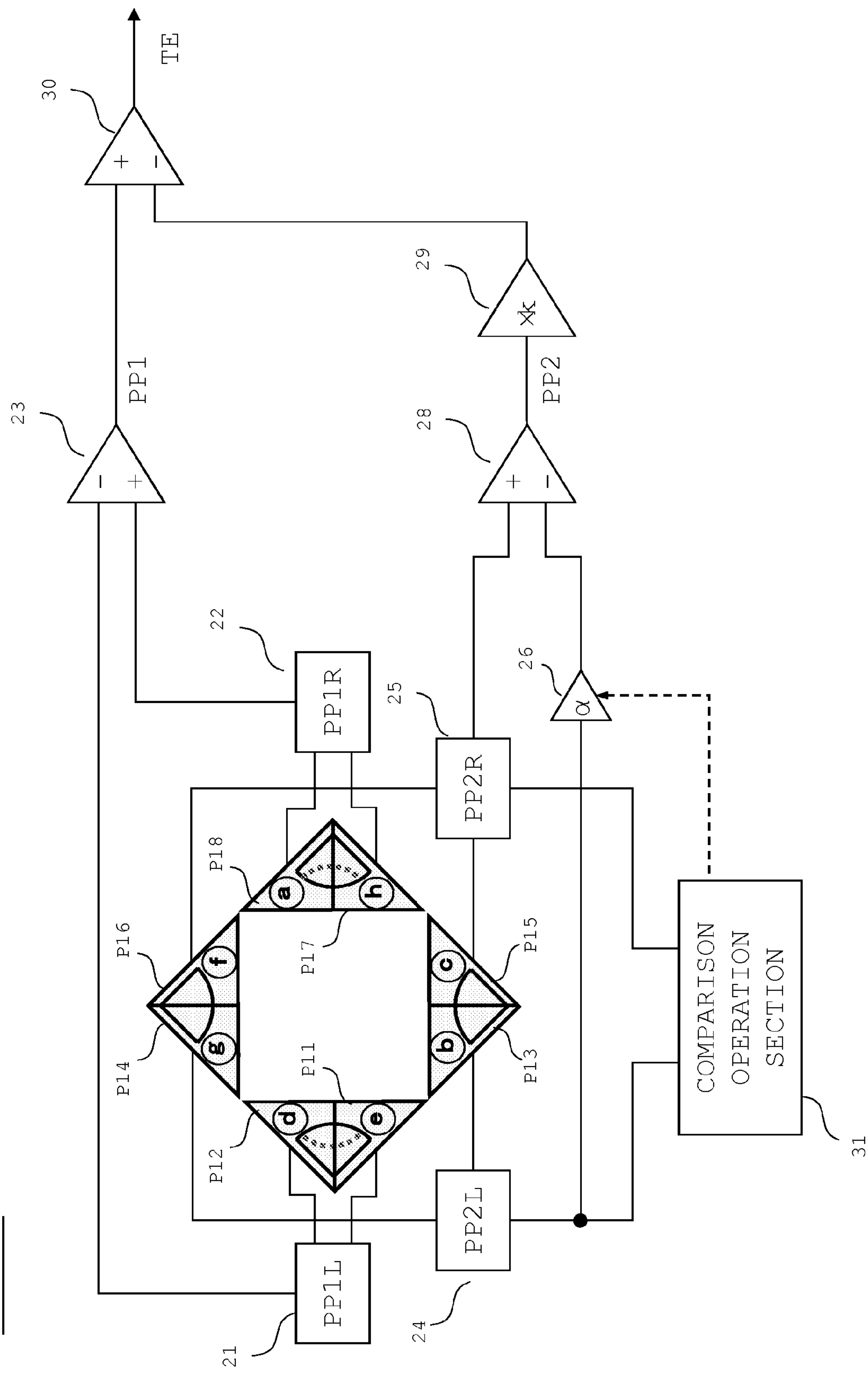
FIG. 17 is a diagram showing a modification of the computing circuit in the inventive example.

For instance, in the computing circuit shown in FIG. 13, the gains (magnifications) $\alpha$ and $\beta$ are adjusted with respect to both of the signals from the adder circuits 24 and 25. Alternatively, one of the gains (magnifications) may be adjusted with respect to one of adder signals. For instance, as shown in FIG. 17, the gain (magnification) $\alpha$ is adjusted with respect to only a signal from the adder circuit 24 to thereby suppress imbalance of signals from the adder circuits 24 and 25, resulting from positional displacements of the sensors. The modification enables to simplify the arrangement of the computing circuit.

Figure 18:
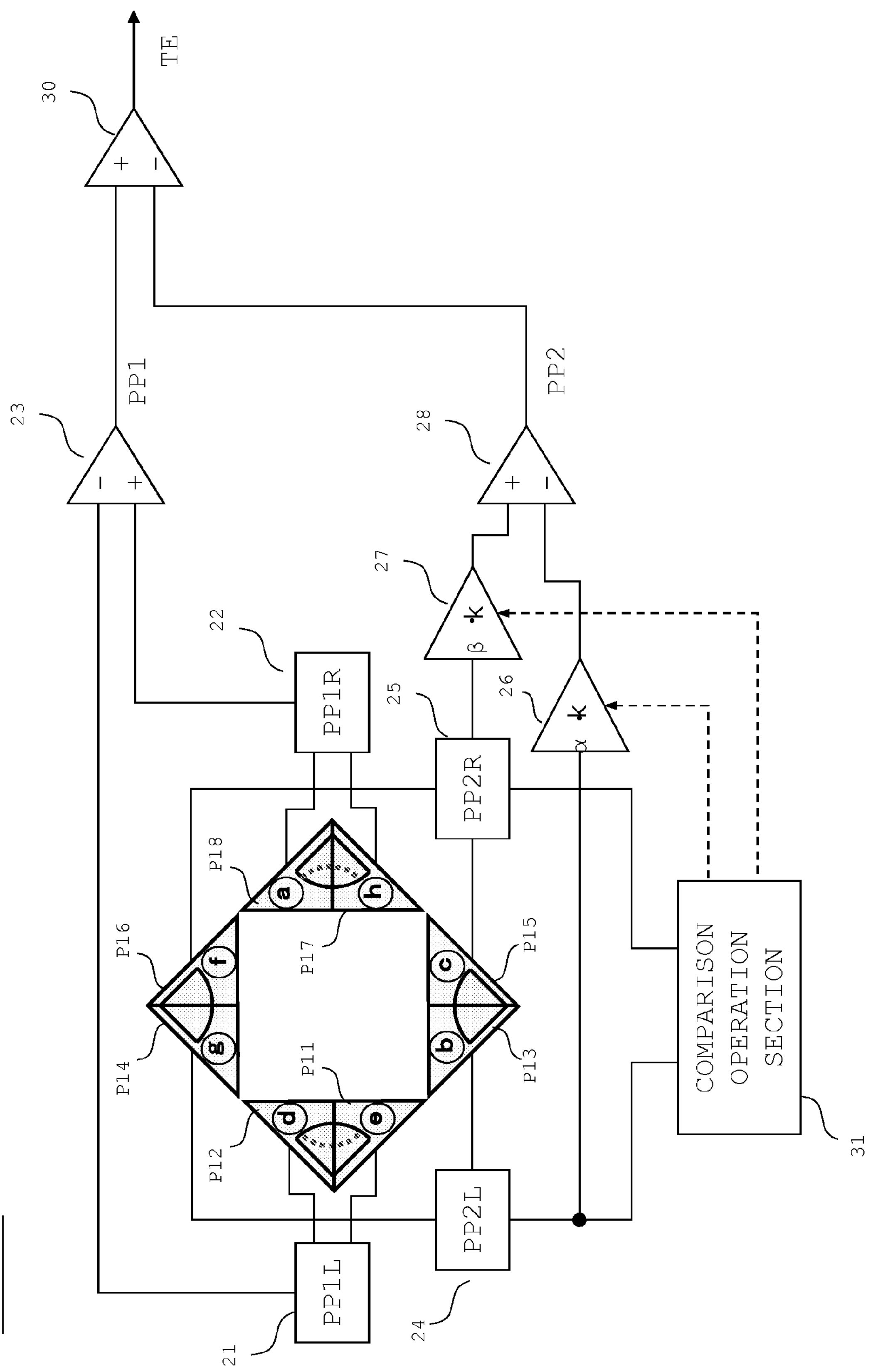
FIG. 18 is a diagram showing another modification of the computing circuit in the inventive example.

Further alternatively, as shown in FIG. 18, the multiplication circuit 29 may be omitted from the computing circuit shown in FIG. 13, and the gain circuits 26 and 27 may perform multiplication by setting the gains (magnifications) of the gain circuits 26 and 27 to $\alpha \cdot k$, and $\beta \cdot k$, respectively, in place of performing multiplication by the multiplication circuit 29. The modification enables to simplify the arrangement of the computing circuit.

In the foregoing example, both of a focus error signal and a tracking error signal are generated based on a signal derived from a single sensor pattern. Alternatively, a sensor pattern for a focus error signal, and a sensor pattern for a tracking error signal may be disposed individually, and signal light from the light flux areas A through D may be guided to each of the sensor patterns.

In the above modification, as shown in FIG. 19C, the sensor pattern for a tracking error signal may have sensors P21 through P24, each of which is formed by electrically connecting two sensors whose outputs are to be summed up by computation. Likewise, as shown in FIG. 19D, the sensor pattern for a focus error signal may have sensors P31 through 34, each of which is formed by electrically connecting two sensors whose outputs are to be summed up by computation.

Figure 20:
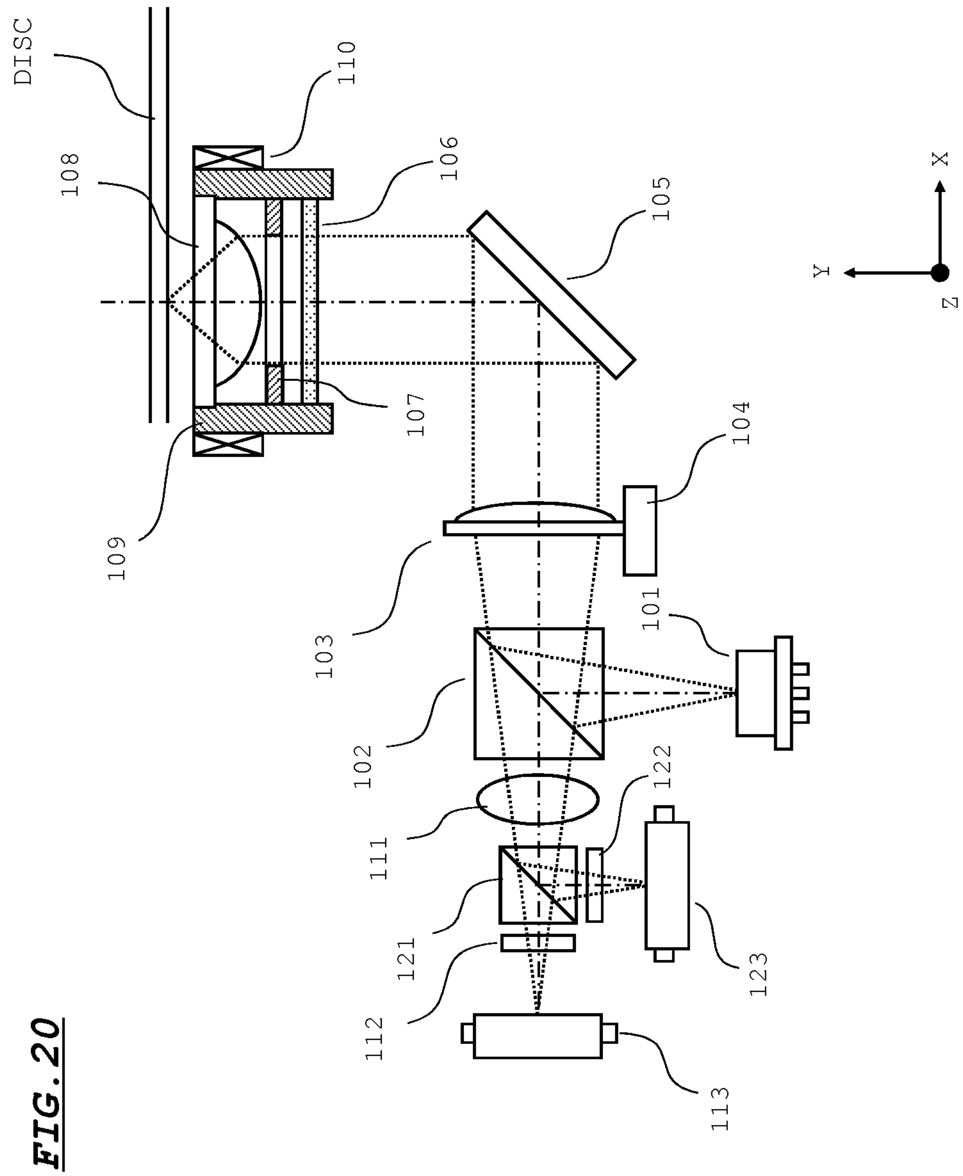
FIG. 20 is a diagram showing a modification of the optical system of the optical pickup device in the inventive example.

The optical system of the optical pickup device may be configured into e.g. an arrangement as shown in FIG. 20. In the optical system shown in FIG. 20, an optical path of laser light is separated by a beam splitter 121. Laser light transmitted through the beam splitter 121 is separated into four light fluxes by the angle adjuster 112, and guided to a light receiving surface of a photodetector 113. Laser light reflected on the beam splitter 121 is separated into four light fluxes by an angle adjuster 122 substantially identical or equivalent to the angle adjuster 112, and guided to a light receiving surface of a photodetector 123. The sensor patterns shown in FIGS. 19C and 19D are disposed on the light receiving surfaces of the photodetectors 113 and 123, respectively, at such a position that the sensor patterns are properly positioned with respect to a signal light area.

In the arrangement shown in FIG. 20, the optical path of laser light is separated by the beam splitter 121. Alternatively, the optical path of laser light may be separated, using another optical element such as a diffraction grating. In the arrangement shown in FIG. 20, the two angular adjusters 112 and 122 are disposed at a position posterior to the beam splitter 121. Alternatively, a single angle adjuster 112 may be disposed at a position anterior to the beam splitter 121.

The embodiment of the invention may be changed or modified in various ways as necessary, as far as such changes and modifications do not depart from the scope of the claims of the invention hereinafter defined.

What is claimed is:

1. An optical pickup device, comprising:

a laser light source;

an objective lens for converging laser light emitted from the laser light source on a recording medium;

an astigmatism element for imparting astigmatism to the laser light reflected on the recording medium to distance a position of a first focal line apart from a position of a second focal line in a propagating direction of the laser light, the first focal line being defined by convergence of the laser light in a first direction, the second focal line being defined by convergence of the laser light in a second direction perpendicular to the first direction;

an angular adjuster for changing propagating directions of light fluxes in four division areas one from the other, the four division areas being obtained by dividing a light flux area of the laser light reflected on the recording medium by a first straight line and a second straight line respectively parallel to the first direction and the second direction, and perpendicularly intersecting with each other;

a photodetector including eight sensors individually receiving eight light fluxes obtained by dividing the light fluxes in the four division areas by a third straight line and a fourth straight line respectively rotated with respect to the first straight line and the second straight line by 45 degrees;

a computing circuit for generating a tracking error signal based on signals from the sensors; and a gain adjusting circuit for adjusting a gain of the signal from the sensor in such a manner that a direct-current component of the tracking error signal resulting from positional displacements of the sensors is cancelled, based on the positional displacements of the sensors in a parallel direction to a light receiving surface of the photodetector.

2. The optical pickup device according to claim 1, wherein the angle adjuster changes the propagating directions of the light fluxes in the four division areas so that the four light fluxes in the four division areas are respectively guided to four vertex positions of a rectangle on the light receiving surface of the photodetector.

3. The optical pickup device according to claim 1, wherein out of the eight sensors, the sensors whose output signals are not subjected to subtraction by the computing circuit are electrically connected to each other.

4. An optical disc device, comprising:

a laser light source;

an objective lens for converging laser light emitted from the laser light source on a recording medium;

an astigmatism element for imparting astigmatism to the laser light reflected on the recording medium to distance a position of a first focal line apart from a position of a second focal line in a propagating direction of the laser light, the first focal line being defined by convergence of the laser light in a first direction, the second focal line being defined by convergence of the laser light in a second direction perpendicular to the first direction;

an angular adjuster for changing propagating directions of light fluxes in four division areas one from the other, the four division areas being obtained by dividing a light flux area of the laser light reflected on the recording medium by a first straight line and a second straight line respectively parallel to the first direction and the second direction, and perpendicularly intersecting with each other;

a photodetector including eight sensors individually receiving eight light fluxes obtained by dividing the light fluxes in the four division areas by a third straight line and a fourth straight line respectively rotated with respect to the first straight line and the second straight line by 45 degrees;

a computing circuit for generating a tracking error signal based on signals from the sensors; and a gain adjusting circuit for adjusting a gain of the signal from the sensor in such a manner that a direct-current component of the tracking error signal resulting from positional displacements of the sensors is cancelled, based on the positional displacements of the sensors in a parallel direction to a light receiving surface of the photodetector.

5. The optical disc device according to claim 4, wherein the angle adjuster changes the propagating directions of the light fluxes in the four division areas so that the four light fluxes in the four division areas are respectively guided to four vertex positions of a rectangle on the light receiving surface of the photodetector.

6. The optical pickup device according to claim 4, wherein out of eight sensors, the sensors whose output signals are not subjected to subtraction by the computing circuit are electrically connected to each other.

* * * * *